US009440319B2

(12) United States Patent
Yamanaka et al.

(10) Patent No.: US 9,440,319 B2
(45) Date of Patent: Sep. 13, 2016

(54) SEAL ASSEMBLING METHOD OF MASTER CYLINDER AND SEAL ASSEMBLING APPARATUS

(75) Inventors: Masatake Yamanaka, Minamikoma-gun (JP); Hideki Hosaka, Minami-Alps (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 527 days.

(21) Appl. No.: 13/599,149

(22) Filed: Aug. 30, 2012

(65) Prior Publication Data

US 2013/0047405 A1 Feb. 28, 2013

(30) Foreign Application Priority Data

Aug. 31, 2011 (JP) ................ P2011-190106

(51) Int. Cl.
| B23P 11/02 | (2006.01) |
| B23P 19/08 | (2006.01) |
| F16J 15/32 | (2016.01) |
| B60T 11/236 | (2006.01) |
| F15B 7/08 | (2006.01) |

(52) U.S. Cl.
CPC ........... *B23P 19/084* (2013.01); *B60T 11/236* (2013.01); *F16J 15/3268* (2013.01); *F15B 7/08* (2013.01); *Y10T 29/4987* (2015.01); *Y10T 29/49872* (2015.01); *Y10T 29/53657* (2015.01); *Y10T 29/53835* (2015.01)

(58) Field of Classification Search
CPC ............. Y10T 29/53657; Y10T 29/4987; Y10T 29/49782; Y10T 29/49895; Y10T 29/49902; Y10T 29/536; Y10T 29/5363; Y10T 29/53796; Y10T 29/53835; Y10T 29/4984; B23P 19/084; B60T 11/236; F16J 15/32; F16J 15/3204; F16J 15/34
USPC ............... 29/450, 451, 464, 468, 235, 213.1
See application file for complete search history.

(56) References Cited

U.S. PATENT DOCUMENTS

| 3,861,020 A * | 1/1975 | Moewe .......................... 29/235 |
| 3,906,607 A * | 9/1975 | Gusev ..................... B23P 19/12 |
| | | 269/266 |
| 4,091,521 A * | 5/1978 | Dygert ........................... 29/451 |

(Continued)

FOREIGN PATENT DOCUMENTS

| JP | U-06-057564 | 8/1994 |
| JP | 2004-521799 | 7/2004 |

(Continued)

OTHER PUBLICATIONS

Mar. 10, 2015 Office Action issued in Japanese Patent Application No. 2011-190106.

*Primary Examiner* — Essama Omgba
(74) *Attorney, Agent, or Firm* — Nixon & Vanderhye P.C.

(57) ABSTRACT

A seal assembling method of a master cylinder for assembling a cup seal for sealing a piston slidably moving in a bottomed-tubular cylinder main body to a seal groove formed in the cylinder main body in an annular shape includes inserting the cup seal into the cylinder main body while inclining the cup seal with respect to an axial direction of the cylinder main body, and assembling the cup seal to the seal groove by moving the cup seal to the seal groove in a state that a position of a center cored bar tool for defining an insertion limit of the cup seal with respect to the cylinder main body is aligned with the seal groove.

6 Claims, 16 Drawing Sheets

(56) References Cited

U.S. PATENT DOCUMENTS

| | | | |
|---|---|---|---|
| 4,141,129 A * | 2/1979 | Martini | 29/235 |
| 4,368,894 A * | 1/1983 | Parmann | 277/615 |
| 5,050,282 A * | 9/1991 | Zannini | 29/235 |
| 6,044,539 A * | 4/2000 | Guzowski | 29/453 |
| 6,775,892 B2 * | 8/2004 | Cotter | 29/268 |
| 6,971,150 B1 * | 12/2005 | Heath | 29/451 |
| 7,040,523 B2 * | 5/2006 | Williams | H05K 3/1233 228/33 |
| 7,310,867 B2 * | 12/2007 | Corbett, Jr. | 29/451 |
| 8,505,176 B2 * | 8/2013 | Ueda et al. | 29/229 |
| 2002/0021439 A1 * | 2/2002 | Priestley | G01J 3/46 356/243.5 |
| 2002/0078547 A1 * | 6/2002 | Cotter | 29/450 |
| 2003/0168006 A1 * | 9/2003 | Williams | H05K 3/1233 118/300 |
| 2004/0079078 A1 | 4/2004 | Bacardit et al. | |
| 2004/0258977 A1 * | 12/2004 | Frank et al. | 429/35 |
| 2009/0069632 A1 * | 3/2009 | McIntyre | A61B 1/00098 600/146 |
| 2011/0088235 A1 * | 4/2011 | Ueda et al. | 29/229 |
| 2012/0324687 A1 * | 12/2012 | Miyajima et al. | 29/235 |

FOREIGN PATENT DOCUMENTS

| | | | |
|---|---|---|---|
| WO | WO 9951387 A1 * | 10/1999 | B23P 19/08 |
| WO | WO 2009153879 A1 * | 12/2009 | B23P 19/02 |

* cited by examiner

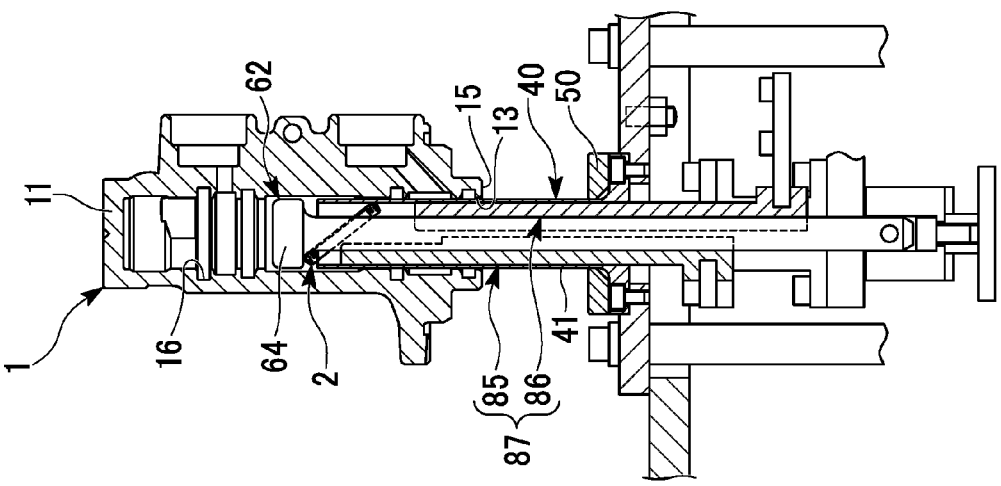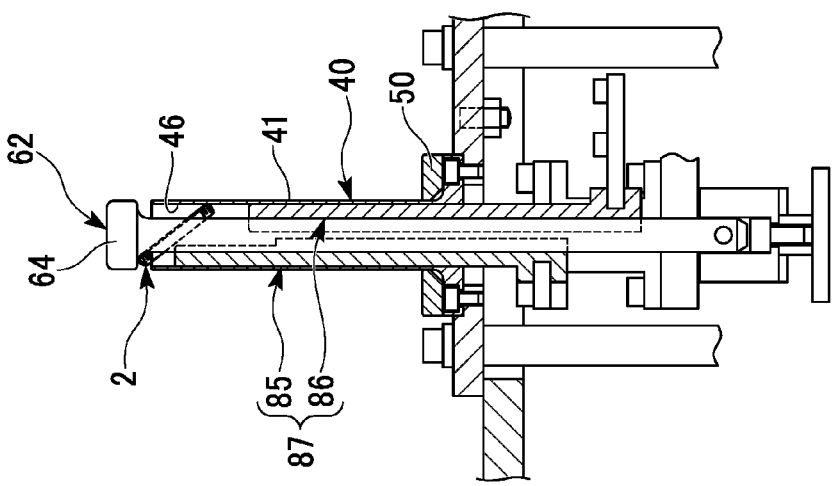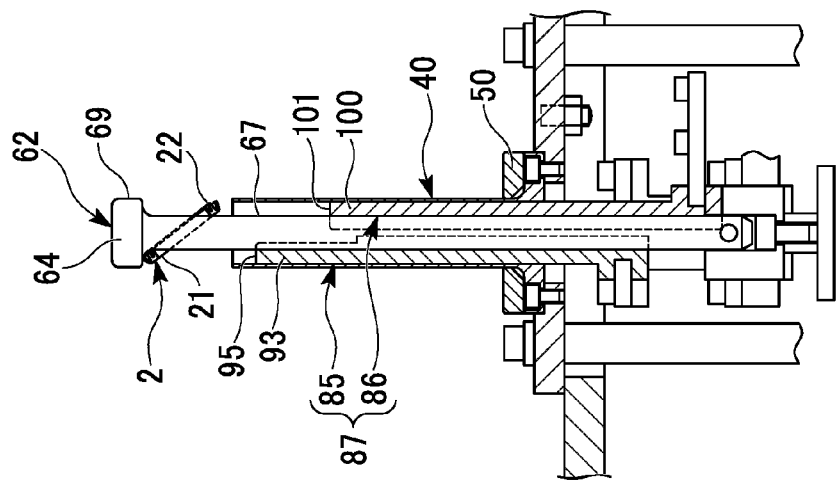

FIG. 12A
FIG. 12B
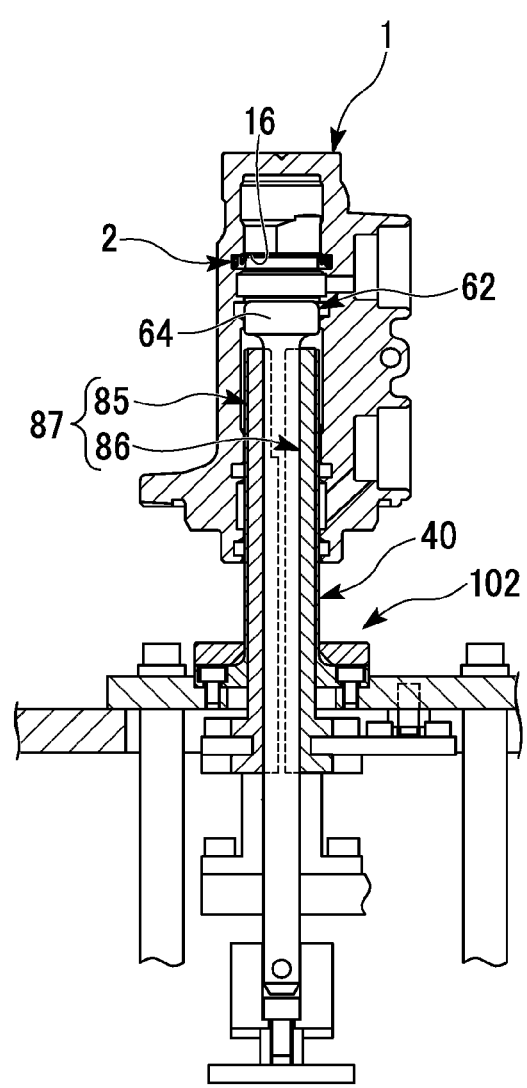
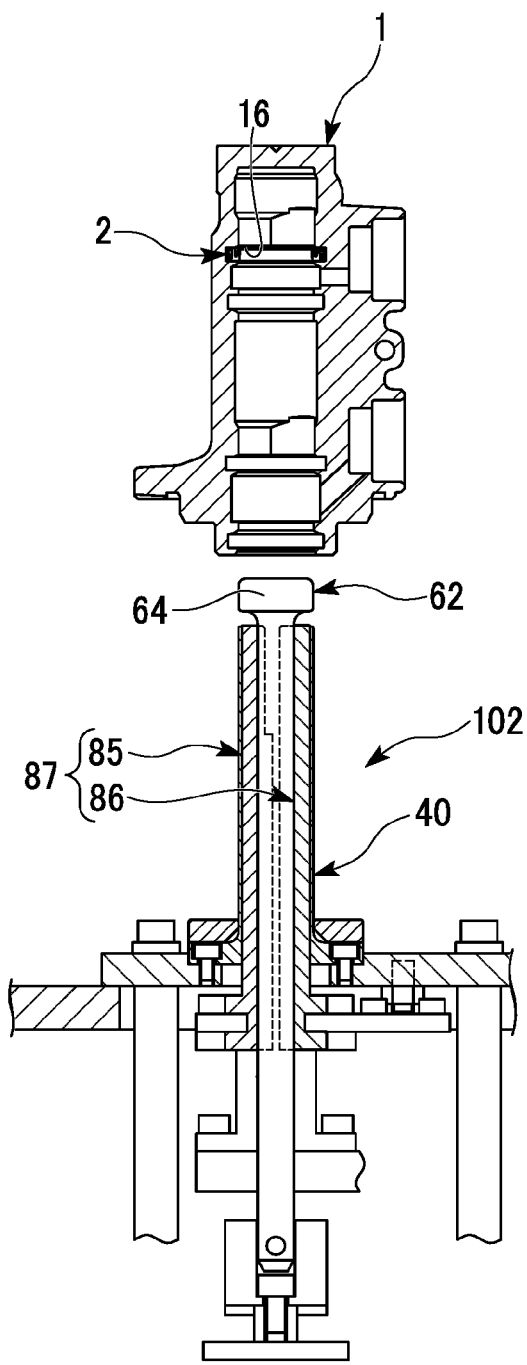

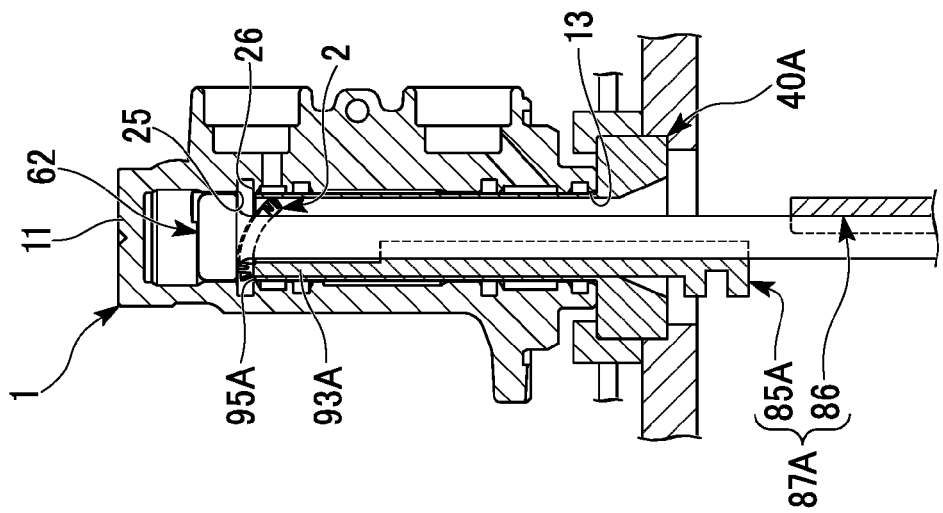
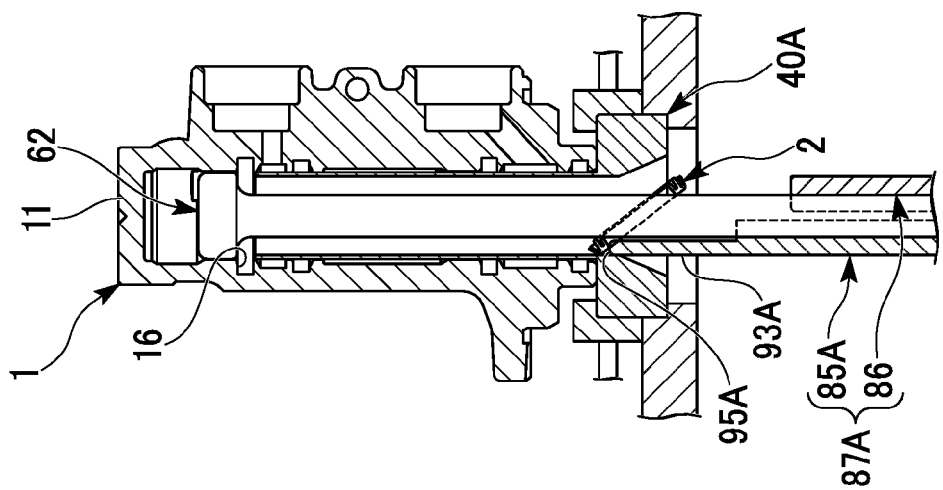
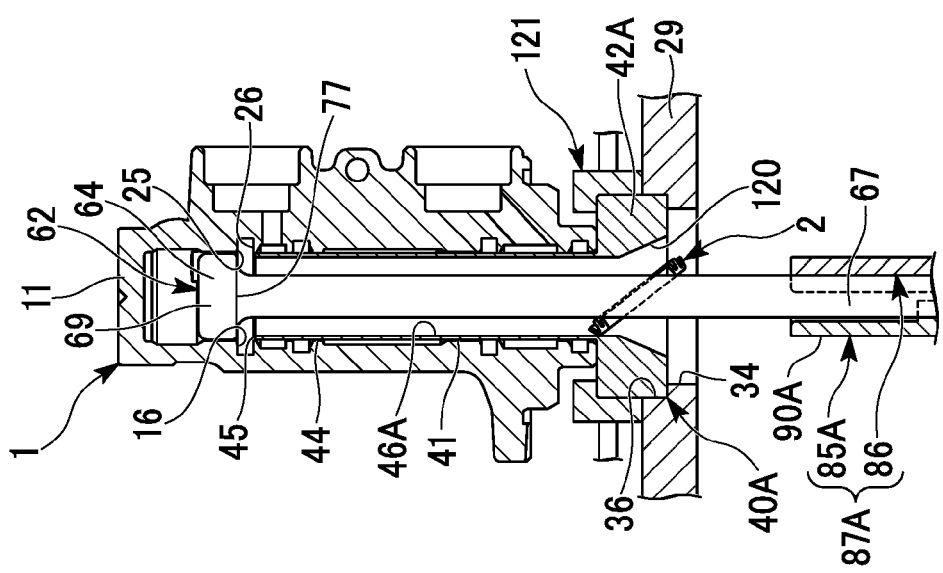

FIG. 15A
FIG. 15B
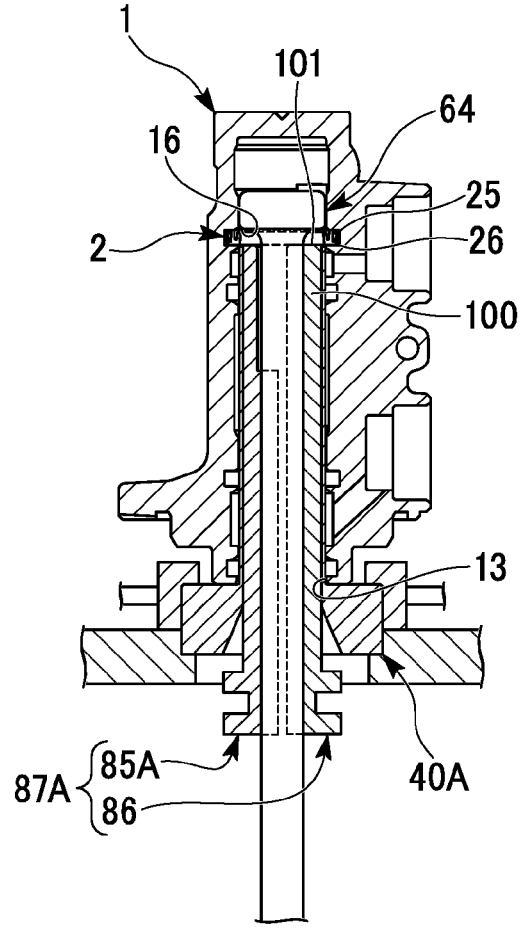
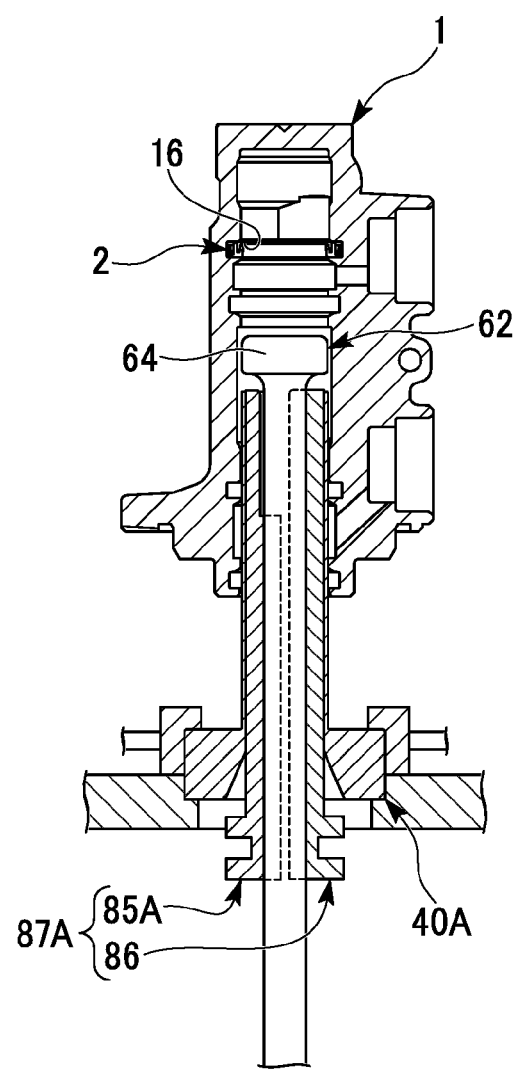

FIG. 16A
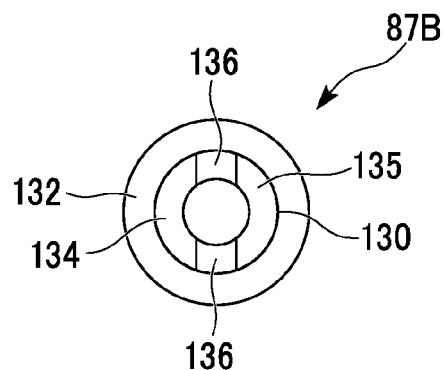
FIG. 16B
FIG. 16C
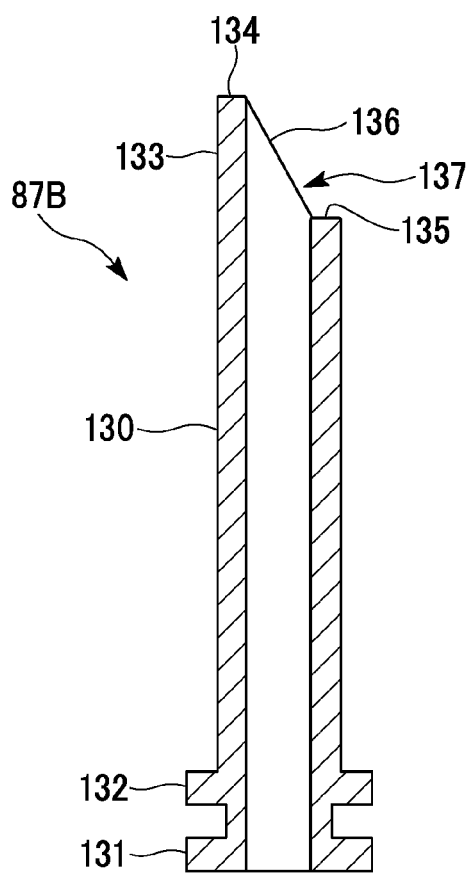
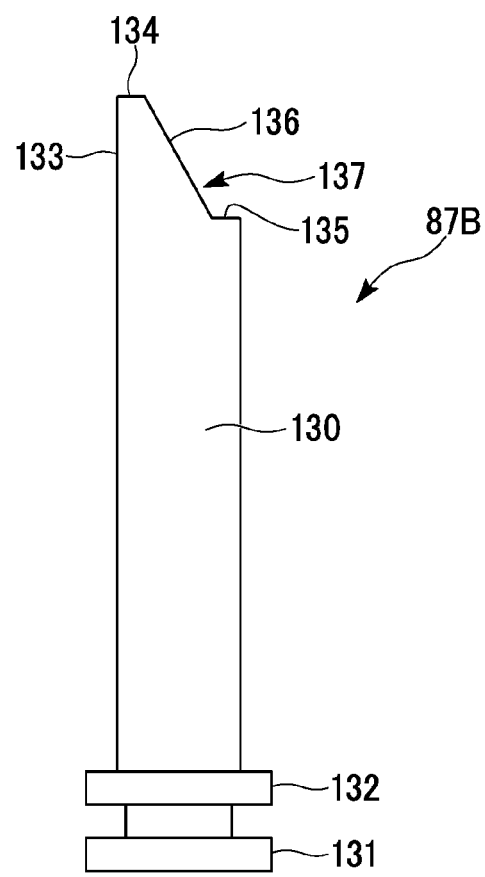

SEAL ASSEMBLING METHOD OF MASTER CYLINDER AND SEAL ASSEMBLING APPARATUS

BACKGROUND OF THE INVENTION

1. Field of the Invention

The present invention relates to a seal assembling method of a master cylinder and a seal assembling apparatus.

Priority is claimed on Japanese Patent Application No. 2011-190106, filed Aug. 31, 2011, the content of which is incorporated herein by reference.

2. Description of Related Art

In a brake master cylinder for a vehicle, there is a technique of disposing a seal in a groove of a main body. In this technique, the seal is inserted into a main body in a state in which the seal is deformed in a horseshoe shape by pliers. The seal inserted into the main body is disposed in the groove of the main body by releasing deformation due to the pliers (for example, see Published Japanese Translation No. 2004-521799 of the PCT International Application)

In the technique, manufacturing efficiency is not high.

SUMMARY OF THE INVENTION

The present invention provides a seal assembling method of a master cylinder and a seal assembling apparatus that are capable of improving manufacturing efficiency.

According to a first aspect of the present invention, a seal assembling method of a master cylinder for assembling a cup seal for sealing a piston slidably moving in a bottomed-tubular cylinder main body to a seal groove formed in the cylinder main body in an annular shape, includes: inserting the cup seal into the cylinder main body while inclining the cup seal with respect to an axial direction of the cylinder main body and; and assembling the cup seal to the seal groove by moving the cup seal to the seal groove in a state that a position of a center cored bar tool for defining an insertion limit of the cup seal with respect to the cylinder main body is aligned with the seal groove.

The seal assembling method of the master cylinder may include, before moving the cup seal to the seal groove of the cylinder main body, inserting the center cored bar tool for limiting the insertion limit of the cup seal into the cylinder main body.

The seal assembling method of the master cylinder may include, disposing an insertion jig into the cylinder main body, wherein the insertion jig moves the cup seal in the direction toward the seal groove in a state in which the cup seal is inclined with respect to the axial direction of the cylinder main body such that one side in a radial direction of the cup seal becomes a bottom section side of the cylinder main body.

According to a second aspect of the present invention, a seal assembling method of a master cylinder for assembling a cup seal for sealing a piston slidably moving in a bottomed-tubular cylinder main body to a seal groove formed in the cylinder main body in an annular shape, includes inserting a center cored bar tool for defining an insertion limit of the cup seal into the cylinder main body, moving the cup seal in a direction toward the seal groove by an insertion jig in a state in which the cup seal is inclined with respect to an axial direction of the cylinder main body such that one side of the cup seal becomes a bottom section side of the cylinder main body, and moving the other side in the radial direction of the cup seal to an insertion limit of the cup seal after moving the one side in the radial direction of the cup seal to the insertion limit by the insertion jig.

The seal assembling method of the master cylinder may include, after moving the one side in the radial direction of the cup seal to the insertion limit of the cup seal using the insertion jig, moving the other side in the radial direction of the cup seal to the insertion limit.

The seal assembling method of the master cylinder may further include, after assembly of the cup seal, a process of determining that the cup seal is assembled to a whole circumference of the seal groove as the center cored bar tool is extracted from the cylinder main body, wherein the center cored bar tool has a portion having a size making a gap formed between the cup seal and a slide guide section of the cylinder main body where the piston slides smaller than a thickness of the cup seal in the radial direction.

The seal assembling method of the master cylinder may further include, after assembly of the cup seal, determining that the cup seal is assembled to a whole circumference of the seal groove as the center cored bar tool is separated from the cylinder main body wherein the center cored bar tool has a head section having a size making a gap formed between the cup seal and a slide guide section of the cylinder main body where the piston slides smaller than a thickness of the cup seal in the radial direction.

According to a third aspect of the present invention, a seal assembling apparatus of a master cylinder for assembling a cup seal for sealing a piston slidably moving in a bottomed-tubular cylinder main body to a seal groove formed in the cylinder main body in an annular shape, includes a center cored bar tool that is capable of being inserted into the cylinder main body and defining an insertion limit of the cup seal; and an insertion jig movably installed at an outer circumferential side of the center cored bar tool in an axial direction of the center cored bar tool, and configured to move the cup seal in a direction toward the seal groove in a state in which the cup seal is inclined with respect to the axial direction of the center cored bar tool such that one side in a radial direction of the cup seal becomes a bottom section side of the cylinder main body. The insertion jig moves the other side in the radial direction of the cup seal to the insertion limit after the one side in the radial direction of the cup seal is moved to the insertion limit of the cup seal.

The seal assembling apparatus of the master cylinder may further include an inspection unit configured to determine that the cup seal is assembled to the seal groove by determining whether the center cored bar tool is extracted from the cylinder main body after assembly of the cup seal.

The insertion jig may be constituted by a pair of semi-tubular bodies that is capable of being inserted between the center cored bar tool and the cylinder main body, and the seal assembling method may further include, after moving the one side in the radial direction of the cup seal to the insertion limit of the cup seal using a one semi-tubular body of the pair of semi-tubular bodies, moving the other side in the radial direction of the cup seal to the insertion limit using an other semi-tubular body of the pair of semi-tubular bodies.

The insertion jig may be constituted by a tubular member that is capable of being inserted between the center cored bar tool and the cylinder main body and having a stepped section formed at a front end thereof, and the seal assembling method may further include, rotating the tubular member after moving the one side in the radial direction of the cup seal to the insertion limit of the cup seal using a front end surface of the tubular member.

The insertion jig may be constituted by a tubular member that is capable of being inserted between the center cored bar tool and the cylinder main body and having an inclined surface formed at a front end thereof, and the seal assembling method may further include, rotating the tubular member after moving the one side in the radial direction of the cup seal to the insertion limit of the cup seal using a front end surface of the tubular member.

According to the seal assembling method of the master cylinder and the seal assembling apparatus of the master cylinder, manufacturing efficiency can be improved.

BRIEF DESCRIPTION OF THE DRAWINGS

FIG. 10A is a side cross-sectional view showing the seal assembling apparatus of the first embodiment after an inclined disposition process.

FIG. 10B is a side cross-sectional view showing the seal assembling apparatus of the first embodiment after a center cored bar tool lowering process.

FIG. 10C is a side cross-sectional view showing the seal assembling apparatus of the first embodiment during a cylinder main body disposition process.

FIG. 12A is a side cross-sectional view showing the seal assembling apparatus of the first embodiment during a removal process.

FIG. 12B is a side cross-sectional view showing the seal assembling apparatus of the first embodiment after the removal process.

FIG. 14A is a side cross-sectional view showing the seal assembling apparatus of the second embodiment after a cylinder main body/guide member disposition process.

FIG. 14B is a side cross-sectional view showing the seal assembling apparatus of the second embodiment during an one side in a radial direction moving process.

FIG. 14C is a side cross-sectional view showing the seal assembling apparatus of the second embodiment after the one side in the radial direction moving process.

FIG. 15A is a side cross-sectional view showing the seal assembling apparatus of the second embodiment after an other side in the radial direction moving process.

FIG. 15B is a side cross-sectional view showing the seal assembling apparatus of the second embodiment during a removal process.

FIG. 16A is a plan view showing an insertion jig of a seal assembling apparatus of a third embodiment.

FIG. 16B is a side cross-sectional view showing the insertion jig of the seal assembling apparatus of the third embodiment.

FIG. 16C is a side view showing the insertion jig of the seal assembling apparatus of the third embodiment.

DETAILED DESCRIPTION OF THE INVENTION

Hereinafter, embodiments of the present invention will be described.

[First Embodiment]

Figure 1:
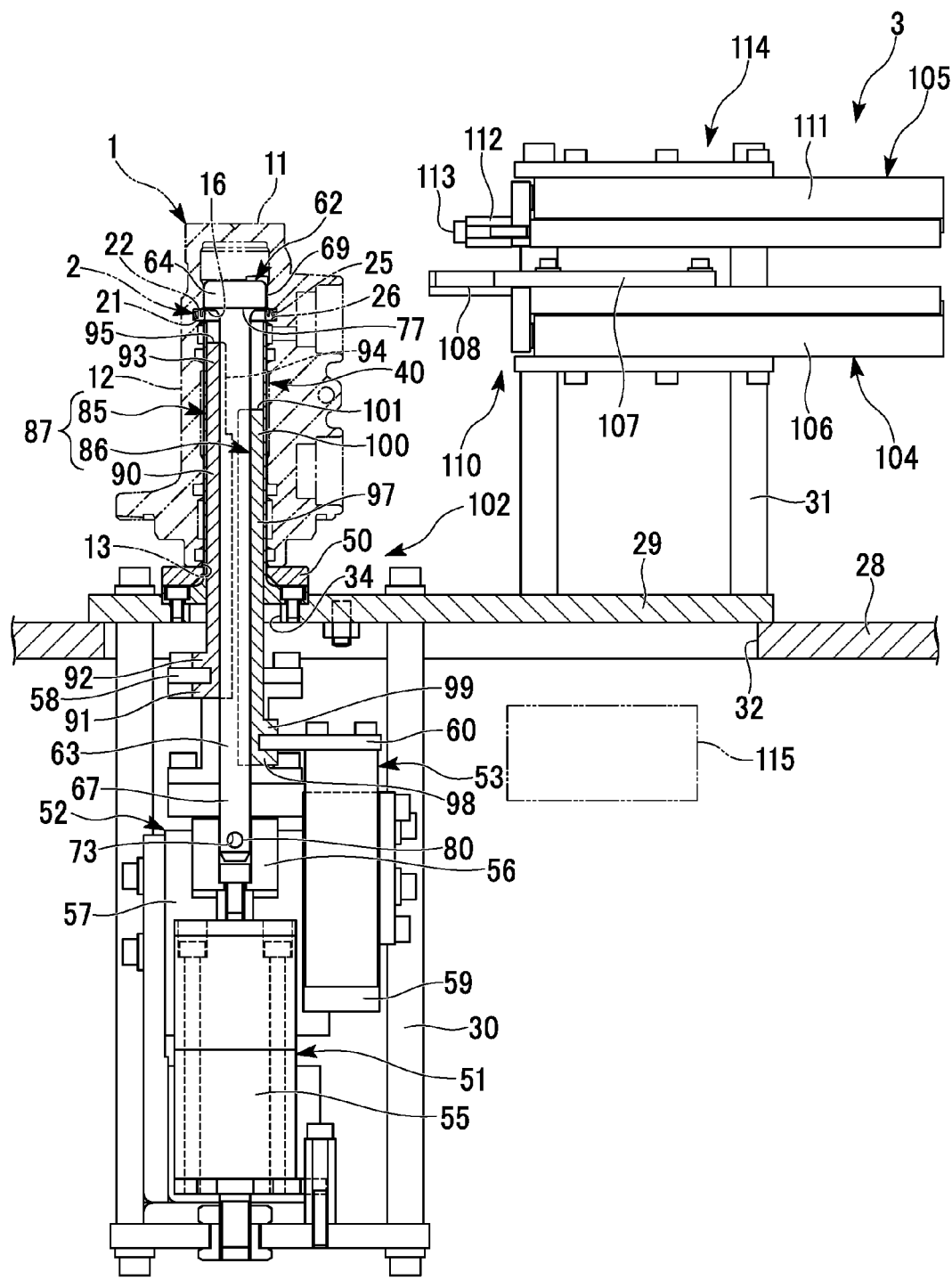
FIG. 1 is a side cross-sectional view showing a seal assembling apparatus of a first embodiment.

A first embodiment will be described with reference to FIGS. 1 to 12B. FIG. 1 shows a seal assembling apparatus 3 of a master cylinder according to a first embodiment of the present invention. The seal assembling apparatus 3 assembles a cup seal 2 with respect to a cylinder main body 1 of the master cylinder.

The master cylinder includes the cylinder main body 1 and the cup seal 2. The master cylinder generates a working fluid pressure depending on an operation amount of a brake pedal (not shown), and supplies the working fluid pressure to a wheel cylinder of a disc brake or a drum brake installed at a wheel.

Figure 2:
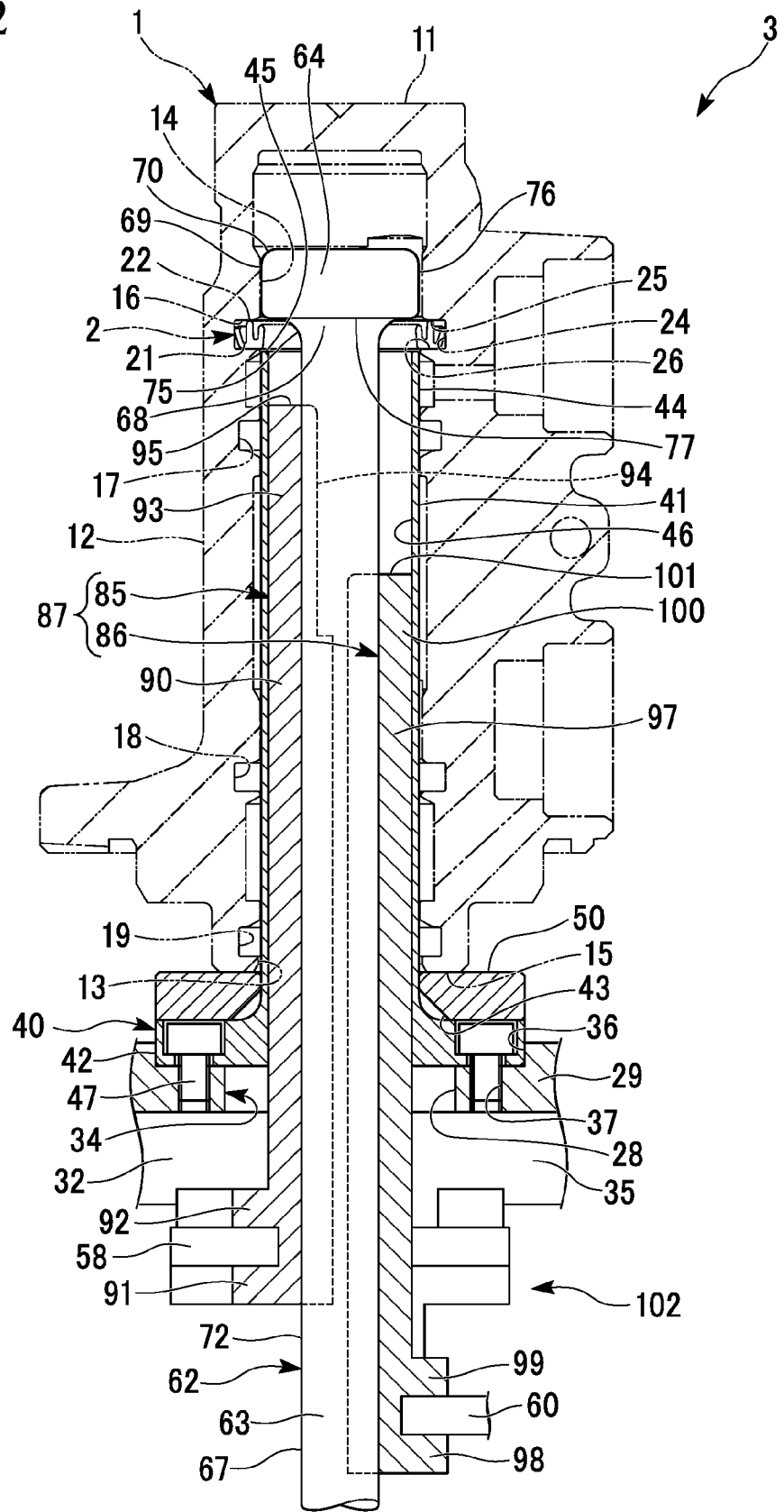
FIG. 2 is an enlarged side cross-sectional view of major parts showing the seal assembling apparatus of the first embodiment.

As shown in FIG. 2, the cylinder main body 1 has a bottom section 11 and a tubular section 12 extending from a rim portion of the bottom section 11 in an axial direction. The cylinder main body 1 has a bottomed-tubular shape in which an opposite side of the bottom section 11 of the tubular section 12 is an opening section 13. The cylinder main body 1 is integrally formed of a metal such as an aluminum alloy in such a shape through casting. A piston (not shown) which moves forward depending on the operation amount of the brake pedal is installed in the cylinder main body 1. For this reason, a slide guide section 14 configured to slidably fit the piston is formed at an inner circumferential section of the tubular section 12 of the cylinder main body 1. A direction of a central axis of the slide guide section 14 is an axial direction of the cylinder main body 1. An end surface 15 of the opening section 13 side of the tubular section 12 is formed in a direction perpendicular to the axis of the cylinder main body 1.

A plurality of annular-shaped seal grooves recessed outward more than the slide guide section 14 in the radial direction are formed in the cylinder main body 1. In the embodiment, specifically, four annular-shaped seal grooves 16 to 19 are sequentially formed from the bottom section 11 side. These seal grooves 16 to 19 have the same concentric annular ring shape as the slide guide section 14. In other words, centers of these seal grooves 16 to 19 coincide with each other with no inclination with respect to the axial direction of the cylinder main body 1. The slide guide section 14 is disposed at each of the seal grooves 16 to 19 near in the axial direction. The seal grooves 16 to 19 have a cross section with a rectangular shape at a surface including a center axis. In addition, the number of seal grooves is not limited to 4 but determined according to the type of the master cylinder. The seal grooves may be formed at 2 or 6 places.

The cup seal 2 having an annular ring shape is assembled to the seal grooves 16 to 19 to be in a fitting state such that an example of the seal groove 16 nearest to the bottom section 11 is illustrated. The cup seal 2 is mainly formed of a rubber material. The cup seal 2 has a shape in which a plurality of lip sections having different diameters extend from an annular ring-shaped base section 21 toward the same side in the axial direction. In the embodiment, specifically, three tubular lip sections 22 extend to the same side in the axial direction. In addition, a shape of the cup seal is not limited to a shape having three tubular lip sections but may have a shape having two lip sections at an inner diameter side and an outer diameter side.

Specifically, two pistons are inserted into the cylinder main body 1. Then, the cup seal 2 disposed at the seal groove 16 nearest to the bottom section 11 and the cup seal (not shown) disposed at the seal groove 17 which is adjacent to the seal groove 16 at an opposite side of the bottom section 11 slide in contact with one piston of the bottom section 11 side to seal the piston. Meanwhile, the cup seals (not shown) respectively disposed at the two seal grooves 18 and 19 of the opening section 13 side slide in contact with the other piston of the opening section 13 side to seal the piston.

Specifically, the seal assembling apparatus 3 assembles the annular ring-shaped cup seal 2 to the seal groove 16 nearest to the bottom section 11. Here, the seal assembling apparatus 3 for assembling the cup seal 2 to the seal groove 16, which is an assembly target, will be described. However, even when the cup seal is assembled to each of the other seal grooves 17 to 19, the same seal assembling apparatus having the following differences is used.

The seal groove 16 has a groove bottom surface 24, a groove wall surface 25 and a groove wall surface 26. The groove bottom surface 24 is a cylindrical surface, which is disposed along the axial direction of the cylinder main body 1. The groove wall surface 25 extends inward in the radial direction from an edge portion of the bottom section 11 side of the groove bottom surface 24 in the direction perpendicular to the axis to be connected to the slide guide section 14. The groove wall surface 26 extends inward in the radial direction from an edge portion of the opening section 13 side of the groove bottom surface 24 in the direction perpendicular to the axis to be connected to the slide guide section 14.

In a natural state before assembly to the seal groove 16, the cup seal 2 has an outer diameter larger than that of the groove bottom surface 24 of the seal groove 16. When the cup seal 2 is fitted to the seal groove 16, the outer circumferential section of the cup seal 2 can be brought into close contact with the groove bottom surface 24. The cup seal 2 has an inner diameter slightly smaller than that of the slide guide section 14 with the cup seal 2 fitted into the seal groove 16. For this reason, the piston is slidably fitted into an inner circumferential section of the cup seal 2.

Figure 3:
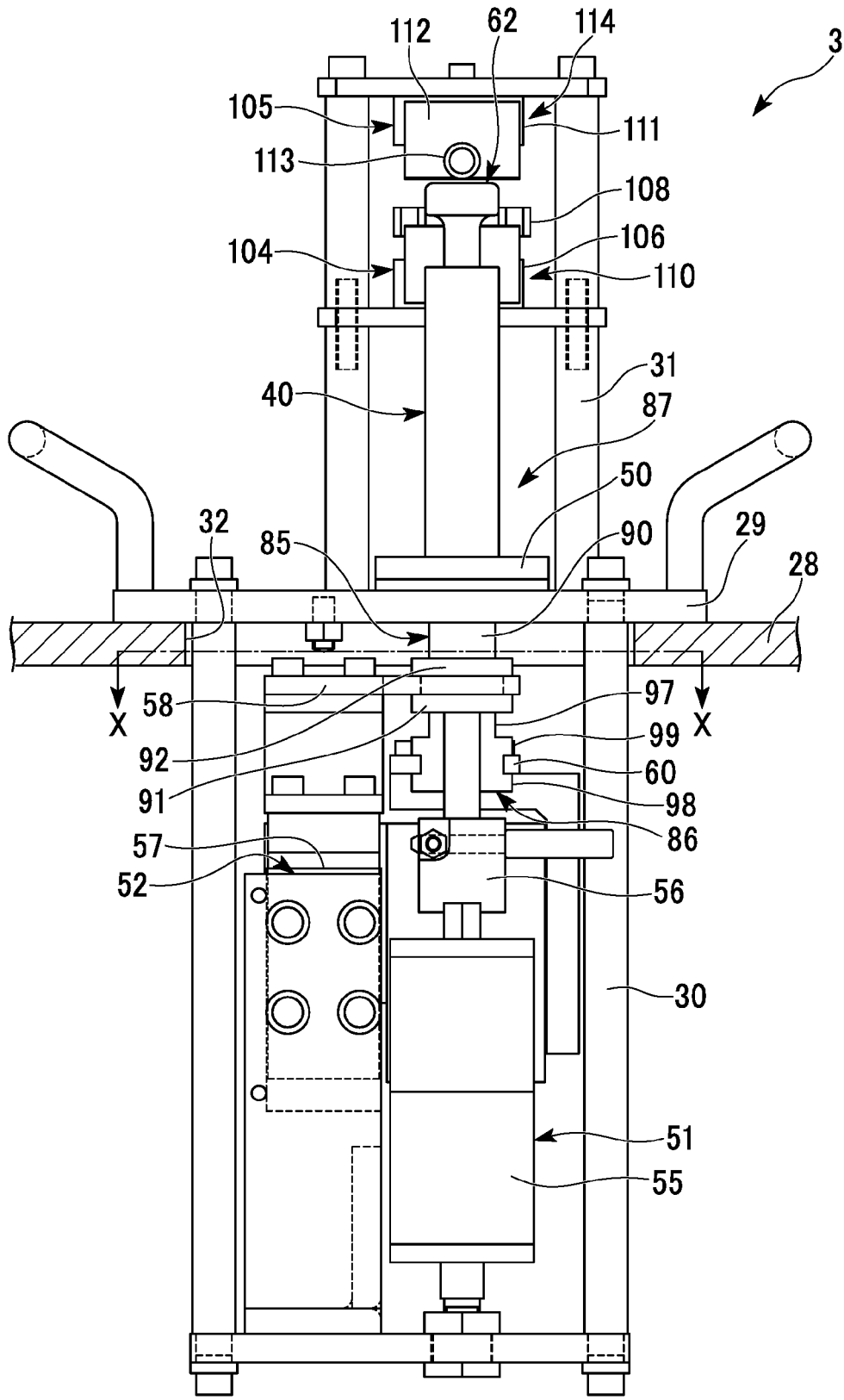
FIG. 3 is a front view showing the seal assembling apparatus of the first embodiment.

As shown in FIGS. 1 and 3, the seal assembling apparatus 3 has a base table 28, a main table 29, a lower frame 30, and an upper frame 31. The base table 28 is horizontally disposed. An opening section 32 passing in the vertical direction is formed at an intermediate section of the base table 28. The main table 29 is placed on the base table 28 so as to cover the opening section 32. The lower frame 30 has an upper portion connected to the main table 29 adjacent to an operator in a horizontal direction (a left side of FIG. 1), and simultaneously extends to pass through the opening section 32 of the base table 28. The upper frame 31 is installed at the main table 29 opposite to the operator (a right side of FIG. 1), rather than the lower frame 30.

As shown in FIG. 2, a through-hole 34 is formed to pass through the main table 29 in the vertical direction. The through-hole 34 has a stepped shape with a lower small diameter hole 35 and an upper large diameter hole 36 having a larger diameter than that of the lower small diameter hole 35. A plurality of threaded holes 37 are formed in the through-hole 34 at a bottom surface position of the large diameter hole 36.

Figure 4A:
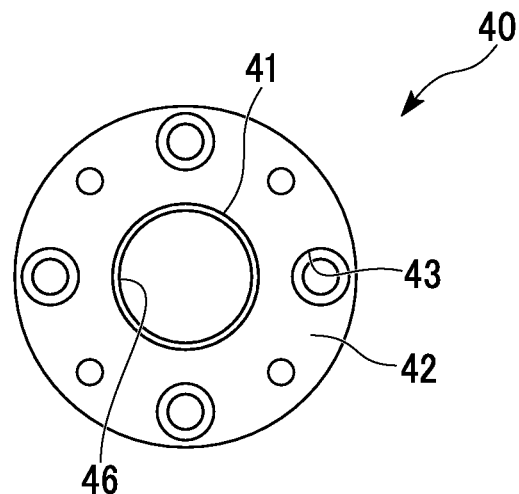
FIG. 4A is a plan view showing a guide ring of the seal assembling apparatus of the first embodiment.
Figure 4B:
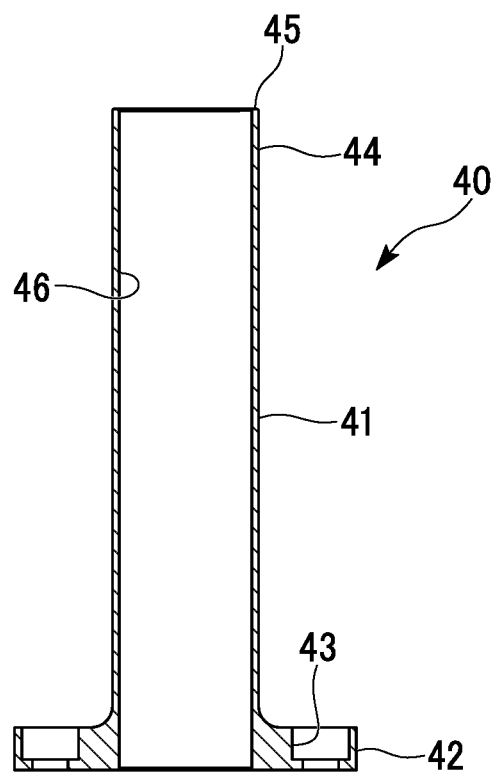
FIG. 4B is a side cross-sectional view showing the guide ring of the seal assembling apparatus of the first embodiment.

A tubular guide member 40 having a constant inner diameter is fixed to the main table 29 to be concentric with the through-hole 34. As shown in FIGS. 4A and 4B, the guide member 40 has a cylindrical section 41 having a thin cylindrical shape, and an annular ring-shaped flange section 42. The flange section 42 protrudes outward in the radial direction from one end in the axial direction of the cylindrical section 41. A plurality of bolt attachment holes 43 are formed in the flange section 42 along the axial direction. In the embodiment, specifically, the four bolt attachment holes 43 are formed along the axial direction. A front end surface 45 of a front end portion 44 opposite to the flange section 42 of the cylindrical section 41 is disposed in the direction perpendicular to the axis. An inner circumferential surface 46 of the guide member 40 has a uniform diameter in the entire axial direction.

As shown in FIG. 2, the guide member 40 is positioned with respect to the main table 29 by fitting the flange section 42 into the large diameter hole 36 of the through-hole 34. Then, in this state, as bolts 47 inserted into the bolt attachment holes 43 are threadedly engaged with the threaded holes 37 of the main table 29, the guide member 40 is fixed to the main table 29. The guide member 40 fixed to the main table 29 extends upward from the main table 29 in the vertical direction. The cylindrical section 41 of the guide member 40 has an outer diameter slightly smaller than the inner diameter of the slide guide section 14 of the cylinder main body 1. The cylindrical section 41 is fitted to the slide guide section 14 of the cylinder main body 1 and positions the cylinder main body 1 in the radial direction such that a central axis thereof coincides with a central axis of the guide member 40.

An annular pedestal 50 is disposed at the flange section 42 of the guide member 40. The pedestal 50 is placed on the flange section 42 in a state in which the cylindrical section 41 of the guide member 40 is inserted into the pedestal 50. The cylinder main body 1 is overlaid on the cylindrical section 41 such that the cylindrical section 41 of the guide member 40 is inserted into the slide guide section 14. Here, the cylinder main body 1 is stopped by the end surface 15 of the opening section 13 side of the tubular section 12 being brought into contact with the pedestal 50. The thickness of the pedestal 50 is set to match positions in the axial direction of the groove wall surface 26 of the seal groove 16 of the cylinder main body 1 and the front end surface 45 of the guide member 40, which are placed thereon. In other words, the thickness of the pedestal 50 is set to match positions in the axial direction of the lower end position of the seal groove 16 of the cylinder main body 1 and the upper end position of the guide member 40, which are placed thereon.

In addition, while not shown, in the seal assembling apparatus for assembling the cup seal to the seal groove 17, the thickness in the axial direction of the pedestal 50 is set to match the lower end position of the seal groove 17 and the upper end position of the guide member 40. Similarly, in the seal assembling apparatus for assembling the cup seal to the seal groove 18, the thickness in the axial direction of the pedestal 50 is set to match positions in the axial direction of the lower end position of the seal groove 18 and the upper end position of the guide member 40. Similarly, in the seal assembling apparatus for assembling the cup seal to the seal groove 19, the thickness in the axial direction of the pedestal 50 is set to match positions in the axial direction of the lower end position of the seal groove 19 and the upper end position of the guide member 40.

As shown in FIG. 1, a plurality of, specifically, three, air cylinders 51 to 53, which are driving means, are attached to the lower frame 30. The air cylinder 51 has a main body section 55 supported by the lower frame 30, and an elevation body 56 installed at the main body section 55 to be capable of moving upward and downward. Air is supplied from an air supply source (not shown) into the main body section 55. The elevation body 56 is raised and lowered with respect to the main body section 55 by supply and exhaust of air into/from the main body section 55. Similarly, the air cylinder 52 also has a main body section 57 and an elevation body 58 installed at the main body section 57 to be capable of raising and lowering. Similarly, the air cylinder 53 also has a main body section 59 and an elevation body 60 installed at the main body section 59 to be capable of raising and lowering.

A center cored bar tool 62 is connected to the elevation body 56 of the air cylinder 51. As shown in FIG. 2, the center cored bar tool 62 is capable of being inserted into the guide member 40 and the cylinder main body 1. The center cored bar tool 62 includes a main shaft section 63 and a head section 64. The main shaft section 63 has a small diameter shaft section 67 and a neck section 68. The head section 64 has a large diameter shaft section 69 and a reduced diameter section 70. The central axes of the small diameter shaft section 67, the neck section 68, the large diameter shaft section 69 and the reduced diameter section 70 coincide with each other.

The small diameter shaft section 67 has an outer circumferential surface 72 having a cylindrical column shape with a uniform diameter in the entire axial direction. As shown in FIG. 1, a connecting hole 73 for connection to the elevation body 56 is formed in the direction perpendicular to the axis at the small diameter shaft section 67 opposite to the head section 64. As shown in FIG. 2, the neck section 68 has a shape such that an outer circumferential surface 75 of the neck section 68 extends from an end portion of the small diameter shaft section 67 to have a diameter becoming larger as it is spaced apart from the small diameter shaft section 67.

The large diameter shaft section 69 is disposed at the neck section 68 opposite to the small diameter shaft section 67. The entire outer circumferential surface 76 of the large diameter shaft section 69 has a uniform diameter larger than that of the small diameter shaft section 67. An end surface 77 of the neck section 68 side of the large diameter shaft section 69 is formed in the direction perpendicular to the axis. The reduced diameter section 70 is formed at the large diameter shaft section 69 opposite to the neck section 68. The reduced diameter section 70 has a shape having a diameter becoming smaller as it is spaced apart from the large diameter shaft section 69. An outer diameter of the large diameter shaft section 69 is equal to an outer diameter of the cylindrical section 41 of the guide member 40.

More specifically, the outer circumferential surface 75 of the neck section 68 has an arc shape in which a cross-section in a plane including a central axis has a center outside the neck section 68. That is, in the outer circumferential surface 75 of the neck section 68, one end portion in the axial direction continues to the outer circumferential surface 72 of the small diameter shaft section 67 along the outer circumferential surface 72, and the other end portion in the axial direction continues to the end surface 77 of the large diameter shaft section 69 along the end surface 77.

As shown in FIG. 1, the center cored bar tool 62 is connected to the elevation body 56 of the air cylinder 51 by a connecting pin 80 inserted into the connecting hole 73. The center cored bar tool 62 extends upward from the elevation body 56, and is inserted into the guide member 40 in a posture in which the head section 64 is disposed in an upper side. The center cored bar tool 62 is raised to an upper limit position when the elevation body 56 is raised according to an operation of the main body section 55 by the air. In addition, the center cored bar tool 62 is lowered to a lower limit position when the elevation body 56 is lowered according to an operation of the main body section 55 by the air. As shown in FIG. 2, the center cored bar tool 62 is configured to match positions in the axial direction of the end surface 77 of the neck section 68 side of the large diameter shaft section 69 and the groove wall surface 25 of the bottom section 11 side of the seal groove 16 of the cylinder main body 1 positioned at the pedestal 50 when lowered to the lower limit position.

Figure 5:
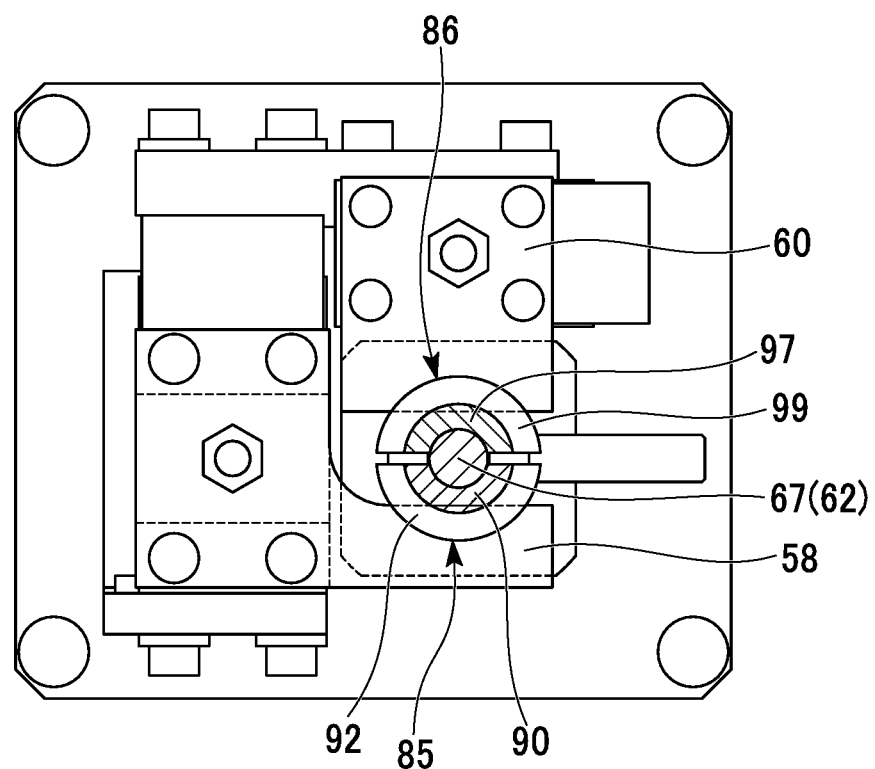
FIG. 5 is a cross-sectional view taken along line X-X of FIG. 3.
Figure 6A:
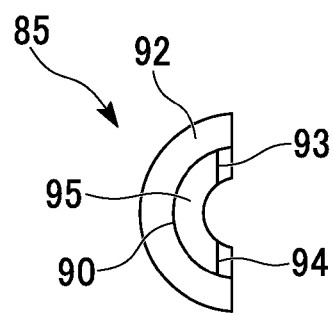
FIG. 6A is a plan view showing one member of an insertion jig of the seal assembling apparatus of the first embodiment.
Figure 6B:
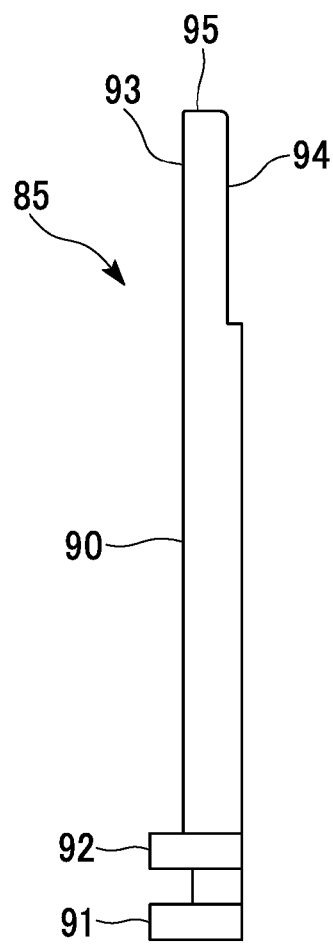
FIG. 6B is a side view showing one member of the insertion jig of the seal assembling apparatus of the first embodiment.
Figure 6C:
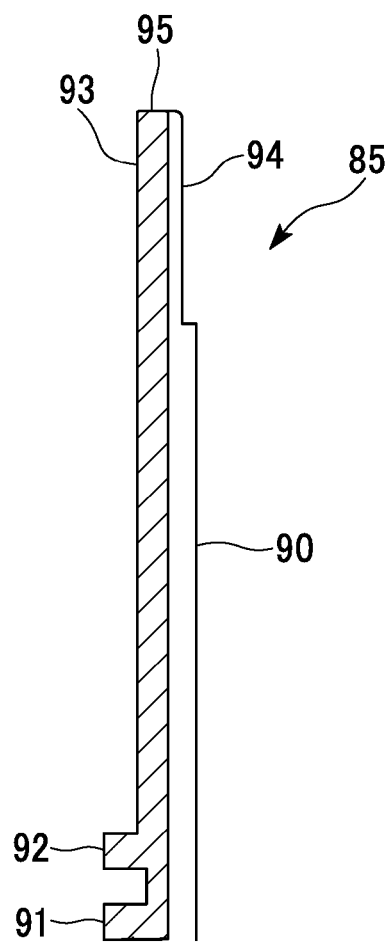
FIG. 6C is a side cross-sectional view showing one member of the insertion jig of the seal assembling apparatus of the first embodiment.

As shown in FIG. 3, a semi-tubular body 85 is connected to the elevation body 58 of the air cylinder 52. The semi-tubular body 85 is one of a pair of semi-tubular bodies 85 and 86 included in an insertion jig 87. The insertion jig 87 moves the cup seal 2 shown in FIG. 2 in a direction toward the seal groove 17. As shown in FIG. 5, the semi-tubular body 85 has a constant inner diameter slightly larger than that of the small diameter shaft section 67 of the center cored bar tool 62. As shown in FIGS. 6A to 6C, the semi-tubular body 85 has a semi-tubular section 90, a flange section 91 and a flange section 92.

The semi-tubular section 90 has a shape in which a circular tube having an outer diameter slightly smaller than the inner diameter of the guide member 40 shown in FIGS. 4A and 4B is cut at a surface adjacent to the central axis and parallel to the central axis. As shown in FIGS. 6A to 6C, a stepped section 94 is formed at the semi-tubular section 90 at a centerline side of a front end portion 93 of one end surface in the axial direction. The thickness in the radial direction of the center position in the circumferential direction of the front end portion 93 is smaller than that of the base end side in the axial direction and the intermediate section by the stepped section 94. That is, in the semi-tubular section 90, side surfaces, which are both ends in the circumferential direction formed from the intermediate section to the other end portion in the axial direction, are disposed at a plane adjacent to the central axis of the semi-tubular section 90, and side surfaces, which are both ends in the circumferential direction of the stepped section 94 of the front end portion 93, are parallel to the side surfaces from the intermediate section to the other end portion and formed to be spaced apart from the central axis of the semi-tubular section 90 from the side surfaces. A front end surface 95, which becomes an upper end, of the front end portion 93 of the semi-tubular section 90 is formed in the direction perpendicular to the axis.

The flange section 91 is formed in a semi-annular shape protruding from the end portion of the semi-tubular section 90 opposite to the front end portion 93 in the axial direction toward the semi-tubular section 90 opposite to the central axis in the radial direction. The flange section 92 is formed in a semi-annular shape protruding from the front end portion 93 side in the axial direction farther than the flange section 91 of the semi-tubular section 90 toward the semi-tubular section 90 opposite to the central axis in the radial direction.

As shown in FIG. 1, the semi-tubular body 85 is fixed to the elevation body 58 of the air cylinder 52 at the flange section 91 and the flange section 92 in a state in which the semi-tubular body 85 is disposed at the operator side (a left side of FIG. 1) of the seal assembling apparatus 3. Accordingly, the semi-tubular body 85 is raised and lowered with the elevation body 58 according to an operation of the main body section 57 by the air. The semi-tubular body 85 inserts the semi-tubular section 90 between the guide member 40 and the small diameter shaft section 67 of the center cored bar tool 62 via the through-hole 34 in a posture in which the semi-tubular section 90 extending upward from the elevation body 58 so that the stepped section 94 is disposed in an upper side.

As shown in FIG. 2, the semi-tubular body 85 is guided by the guide member 40 and the small diameter shaft section 67 of the center cored bar tool 62 to be raised and lowered therebetween. In other words, the semi-tubular body 85 is movably installed at the outer circumferential side of the center cored bar tool 62 in the axial direction of the center cored bar tool 62. The semi-tubular body 85 is configured to match positions in the axial direction of the front end surface 95 of the semi-tubular section 90 and the groove wall surface 26 of the opening section 13 side of the seal groove 16 of the cylinder main body 1 positioned at the pedestal 50 when raised to the upper limit position. In other words, the semi-tubular body 85 is configured to match positions in the axial direction of the upper end position thereof and the lower end position of the seal groove 16 of the cylinder main body 1 positioned at the pedestal 50 when raised to the upper limit position.

As shown in FIG. 1, the other semi-tubular body 86 of the insertion jig 87 is connected to the elevation body 60 of the air cylinder 53. The semi-tubular body 86 has the same inner diameter and the same outer diameter as the semi-tubular body 85. The semi-tubular body 86 has a semi-tubular section 97, a flange section 98, and a flange section 99.

Figure 7A:
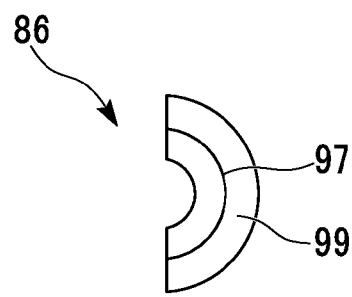
FIG. 7A is a plan view showing the other member of the insertion jig of the seal assembling apparatus of the first embodiment.
Figure 7B:
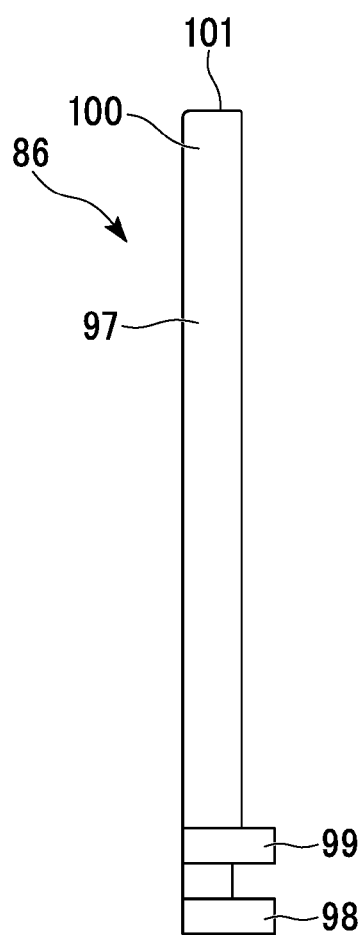
FIG. 7B is a side view showing the other member of the insertion jig of the seal assembling apparatus of the first embodiment.
Figure 7C:
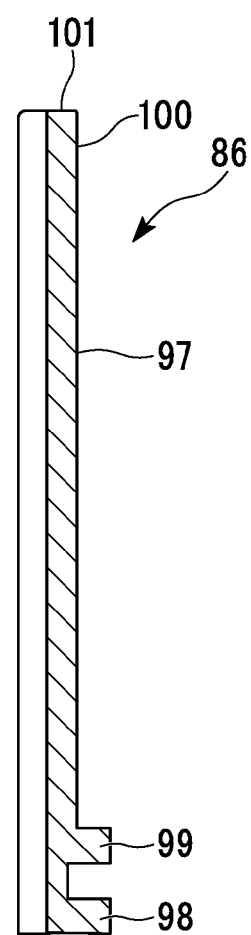
FIG. 7C is a side cross-sectional view showing the other member of the insertion jig of the seal assembling apparatus of the first embodiment.

Similar to the semi-tubular section 96, the semi-tubular section 97 has a shape in which a circular tube having an outer diameter slightly smaller than the inner diameter of the guide member 40 is cut at a surface adjacent to the central axis and parallel to the central axis. In addition, as shown in FIGS. 7B and 7C, the stepped section 94 formed at the one semi-tubular body 85 shown in FIGS. 6A to 6C is not formed at a front end portion 100 of the semi-tubular body 86. That is, as shown in FIGS. 7B and 7C, in the semi-tubular section 97 of the semi-tubular body 86, throughout the axial direction, side surfaces, which become both ends in the circumferential direction, are disposed at a plane adjacent to the central axis of the semi-tubular body 86. A front end surface 101, which becomes an upper end, of the front end portion 100 of the semi-tubular section 97 is formed in the direction perpendicular to the axis.

The flange section 98 is formed in a semi-annular shape protruding from the end portion of the semi-tubular section 97 opposite to the front end portion 100 in the axial direction toward the semi-tubular section 97 opposite to the central axis in the radial direction. In addition, the flange section 98 is formed in a semi-annular shape protruding from the front end portion 100 side in the axial direction farther than the flange section 98 of the semi-tubular section 97 toward the semi-tubular section 97 opposite to the central axis in the radial direction.

As shown in FIG. 1, the semi-tubular body 86 is fixed to the elevation body 60 of the air cylinder 53 at the flange section 98 and the flange section 99 in a state in which the semi-tubular body 86 is disposed at the seal assembling apparatus 3 opposite to the operator (a right side of FIG. 1). Accordingly, the semi-tubular body 86 is raised and lowered with the elevation body 60 according to an operation of the main body section 59 by the air. The semi-tubular body 86 is inserted between the guide member 40 and the small diameter shaft section 67 of the center cored bar tool 62 via the through-hole 34 in a posture in which the semi-tubular section 97 extends upward from the elevation body 60.

As shown in FIG. 2, the semi-tubular body 86 is guided by the guide member 40 and the small diameter shaft section 67 of the center cored bar tool 62 to be raised and lowered therebetween. In other words, the semi-tubular body 86 is movably installed at the outer circumferential side of the center cored bar tool 62 in the axial direction of the center cored bar tool 62. The semi-tubular body 86 is configured to match positions in the axial direction of a front end surface 101 of the semi-tubular section 97 and the groove wall surface 26 of the opening section 13 side of the seal groove 16 of the cylinder main body 1 positioned at the pedestal 50 when raised to the upper limit position. In other words, the semi-tubular body 86 is configured to match positions in the axial direction of the upper end position thereof and the lower end position of the seal groove 16 of the cylinder main body 1 positioned at the pedestal 50 when raised to the upper limit position.

In addition, a stroke of the elevation body 60 of the air cylinder 53 configured to drive the semi-tubular body 86 is larger than a stroke of the elevation body 58 of the air cylinder 52 shown in FIG. 1 and configured to drive the semi-tubular body 85. Accordingly, since the positions of the front end surfaces 95 and 101 are matched when both are at the upper limit position, as shown in FIG. 1, when both are at the lower limit position, the front end surface 101 of the semi-tubular body 86 is disposed lower than the front end surface 95 of the semi-tubular body 85. Here, even when the semi-tubular bodies 85 and 86 are disposed at the lower limit position, the front end portions 93 and 100 sides are disposed in the guide member 40 and do not exit from the guide member 40.

The guide member 40, the air cylinders 51 to 53, the center cored bar tool 62 and the insertion jig 87 configure an assembly mechanism 102 which assemble the cup seal 2 to the cylinder main body 1.

Air cylinders 104 and 105, which are driving means, are attached to the upper frame 31. The air cylinder 104 has a main body section 106 supported by the upper frame 31, and a movable body 107 installed at the center cored bar tool 62 side in the horizontal direction of the main body section 106. Air is supplied from an air supply source (not shown) into the main body section 106. The movable body 107 horizontally moves with respect to the main body section 106 to approach or be spaced from the center cored bar tool 62 by supply and exhaust of the air into/from the main body section 106.

A detection unit 108 is installed at the movable body 107. The detection unit 108 detects presence and direction of the cup seal 2 temporarily held at the large diameter shaft section 69 of the center cored bar tool 62, which is in the upper limit position. The detection unit 108 is disposed to match a position in the vertical direction with the large diameter shaft section 69 of the center cored bar tool 62, which is in the upper limit position. For example, the detection unit 108 compresses the cup seal 2 and detects the presence of the cup seal 2 through presence or absence of a reaction force caused upon the compression. Accordingly, the detection unit 108 detects whether the cup seal 2 is in a normal posture in which a lip section 22 is directed upward, from a difference in reaction forces of a plurality of positions in the vertical direction. The air cylinder 104 and the detection unit 108 constitute a seal detection mechanism 110 configured to detect the presence and direction of the cup seal 2.

The air cylinder 105 has a main body section 111 supported by the upper frame 31, and a movable body 112 installed at the center cored bar tool 62 side in the horizontal direction of the main body section 111. Air is supplied from an air supply source (not shown) into the main body section 111. The movable body 112 horizontally moves with respect to the main body section 111 to approach and be spaced apart from the center cored bar tool 62 by supply and exhaust of the air into/from the main body section 111.

A detection unit 113 configured to detect presence of the cylinder main body 1 is installed at the movable body 112. For example, the detection unit 113 compresses the cylinder main body 1 and detects the presence of the cylinder main body 1 through the presence or absence of a reaction force caused upon the compression. The air cylinder 105 and the detection unit 113 constitute a set detection mechanism 114 configured to detect the presence of the cylinder main body 1.

The seal assembling apparatus 3 includes a control unit 115 configured to control the assembly mechanism 102, the seal detection mechanism 110 and the set detection mechanism 114, a manipulation button (not shown) configured to be manipulated by a pressing force of an operator, an alarm unit (not shown) configured to generate an alarm sound toward the operator, and a display unit (not shown) configured to perform a display toward the operator.

Next, a seal assembling method of the master cylinder of the first embodiment using the above-mentioned seal assembling apparatus 3 will be described along with works performed by an operator.

Figure 8A:
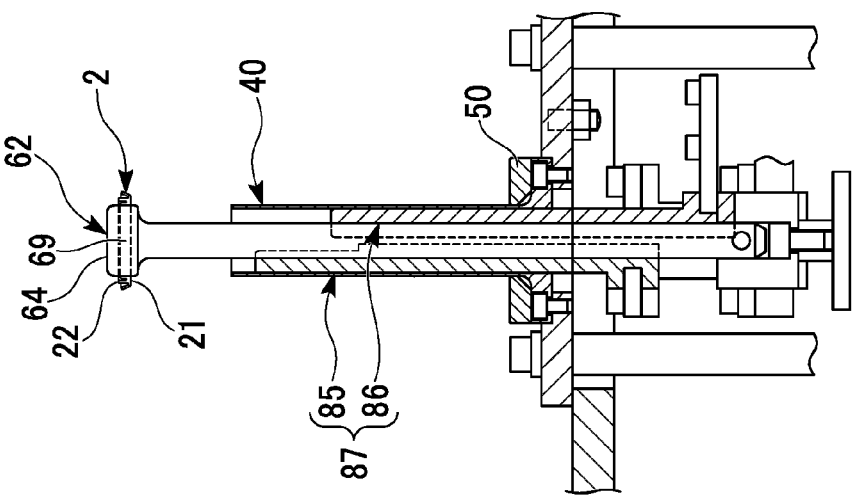
FIG. 8A is a side cross-sectional view of the seal assembling apparatus of the first embodiment, showing an initial state.

As shown in FIGS. 1 and 2, in the initial state of the seal assembling apparatus 3, all of the center cored bar tool 62 of the assembly mechanism 102, the semi-tubular body 85 of the insertion jig 87, and the semi-tubular body 86 are disposed at the lower limit position. In addition, in the initial state, as shown in FIG. 1, the detection unit 108 of the seal detection mechanism 110 is disposed at a release position spaced apart from the center cored bar tool 62 in the horizontal direction. In the initial state, as shown in FIG. 8A, in the insertion jig 87, the front end surface 101 of the front end portion 100 of the semi-tubular body 86 is disposed lower than the front end surface 95 of the front end portion 93 of the semi-tubular body 85, thus becoming uneven state.

Figure 8B:
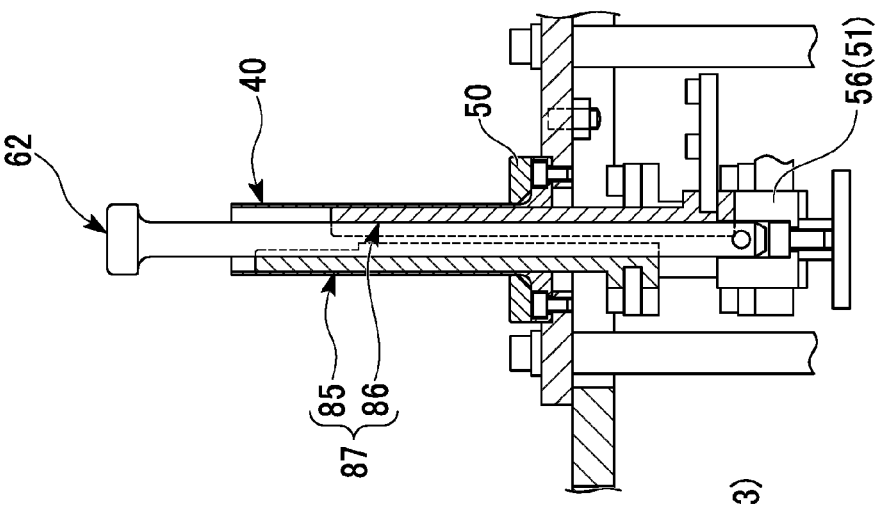
FIG. 8B is a side cross-sectional view showing the seal assembling apparatus of the first embodiment after a raising process.

The operator performs a first button manipulation from the initial state at the beginning of a seal assembly task. When the first button manipulation is performed, the control unit 115 shown in FIG. 1 performs a raising process in which the center cored bar tool 62 is raised and stopped at the upper limit position by the air cylinder 51 of the assembly mechanism 102, as shown in FIG. 8B.

Figure 8C:
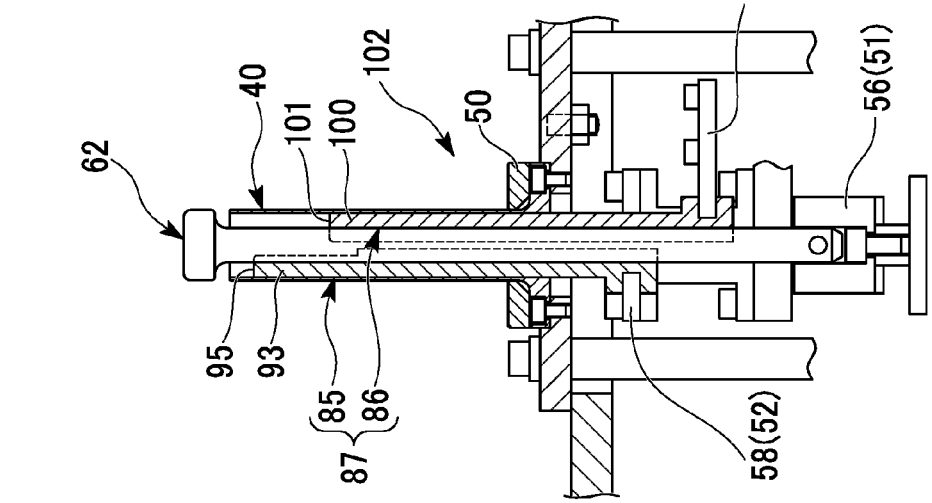
FIG. 8C is a side cross-sectional view showing the seal assembling apparatus of the first embodiment after a temporary holding process.

When the operator looks at stoppage after elevation of the center cored bar tool 62, as shown in FIG. 8C, the operator performs a temporary holding process in which the cup seal 2 is fitted to the large diameter shaft section 69 of the center cored bar tool 62 in a predetermined direction such that, specifically, the base section 21 is disposed downward and the lip section 22 is disposed upward.

Figure 9:
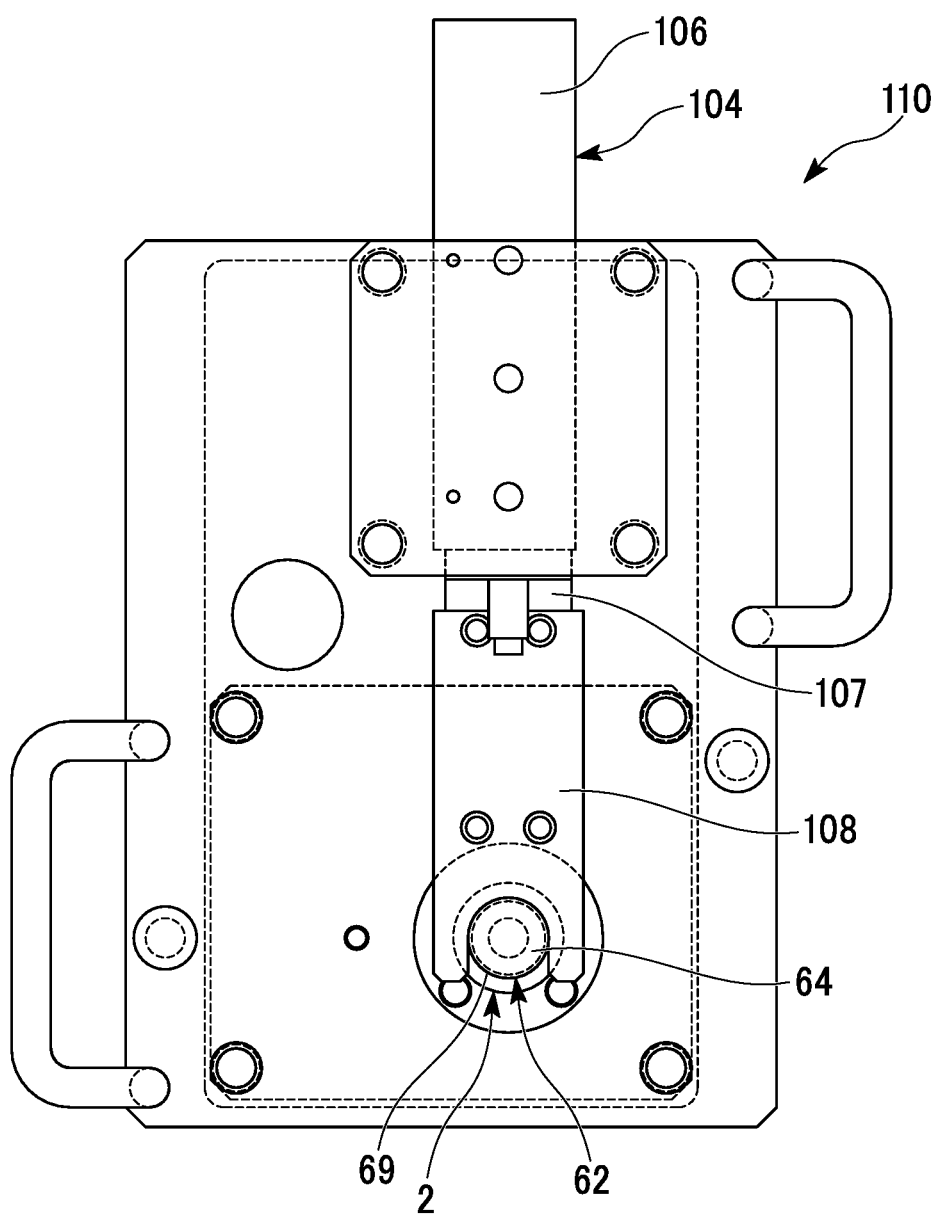
FIG. 9 is a plan view showing the middle of an inspection process of the seal assembling apparatus of the first embodiment.

Next, the operator performs a second button manipulation. When the second button manipulation is performed, the control unit 115 shown in FIG. 1 performs a seal checking process in which the detection unit 108 is moved forward as shown in FIG. 9 by the air cylinder 104 of the seal detection mechanism 110, presence of the cup seal 2 of the center cored bar tool 62 and a direction of the cup seal 2 are detected by the detection unit 108, and then the detection unit 108 is retracted to the release position shown in FIG. 1.

The control unit 115 generates an alarm sound from the alarm unit and displays an alarm image on the display unit when the detection unit 108 cannot detect whether the cup seal 2 is present, or whether the cup seal 2 is in a correct posture even when the cup seal 2 is present. In this case, the operator mounts or remounts the cup seal 2 on the large diameter shaft section 69 of the center cored bar tool 62, performing the second button manipulation again. When the second button manipulation is performed again, the control unit 115 stops the alarm sound of the alarm unit when the detection unit 108 detects that the cup seal 2 is mounted in a correct direction.

In the seal checking process by the second button manipulation, when the detection unit 108 detects that the cup seal 2 is present in a correct direction, the control unit 115 is in a state capable of receiving a third button manipulation.

The operator checks that the detection unit 108 is retracted to the release position and the alarm is not generated, and as shown in FIG. 10A, performs an inclined disposition process that is to incline the cup seal 2 at a position of the small diameter shaft section 67 such that an inside (a right side of FIG. 10A) is lower than a front side (a left side of FIG. 10A) while releasing the cup seal 2 to the small diameter shaft section 67 from the large diameter shaft section 69 of the center cored bar tool 62. That is, in the inclined disposition process, eventually, the cup seal 2 is inclined such that the front end surface 95 of the front end portion 93 of the semi-tubular body 85 of the insertion jig 87 and the front end surface 101 of the front end portion 100 of the semi-tubular body 86 are matched in an uneven state. In other words, in the inclined disposition process, the cup seal 2 is in an inclined state in which the semi-tubular body 85 side in the horizontal direction, which is one side in the radial direction, is disposed at an upper side, and the semi-tubular body 86 side in the horizontal direction, which is the other side in the radial direction, is disposed at a lower side. Further, in other words, in the inclined disposition process, the cup seal 2 is in an inclined state along a stepped shape of the front end surfaces 95 and 101 of the insertion jig 87. Here, since the cup seal 2 has a high friction coefficient and adhesion, the cup seal 2 is held at the small diameter shaft section 67 in the inclined state due to the adhesion.

In addition, as will be described below, when the cylinder main body 1 is overlaid on the guide member 40, the axial direction of the center cored bar tool 62 and the guide member 40 coincides with the axial direction of the cylinder main body 1. For this reason, the inclined disposition process is a process of inclining the cup seal 2 with respect to the axial direction of the cylinder main body 1 and disposing the cup seal 2 at the center cored bar tool 62. In addition, according to the inclined disposition process, the cup seal 2 is inclined with respect to the axial direction of the cylinder main body 1 such that one side in the radial direction of the cup seal 2 becomes the bottom section 11 side of the cylinder main body 1.

Next, the operator performs a third button manipulation. When the third button manipulation is performed, the control unit 115 shown in FIG. 1 performs a center cored bar tool lowering process of lowering and stopping the center cored bar tool 62 to the lower limit position by the air cylinder 51 of the assembly mechanism 102, as shown in FIG. 10B. Then, while maintaining the inclined state, the cup seal 2 is lowered with the center cored bar tool 62 to be inserted into the guide member 40 except for the upper end portion. Here, the cup seal 2 is inclined to conform to a shape of the inner circumferential surface 46 of the cylindrical section 41 of the guide member 40. Accordingly, the cup seal 2 is deformed in an elliptical shape and falls into a range of the head section 64 of the center cored bar tool 62 when seen in the axial direction.

Figure 11A:
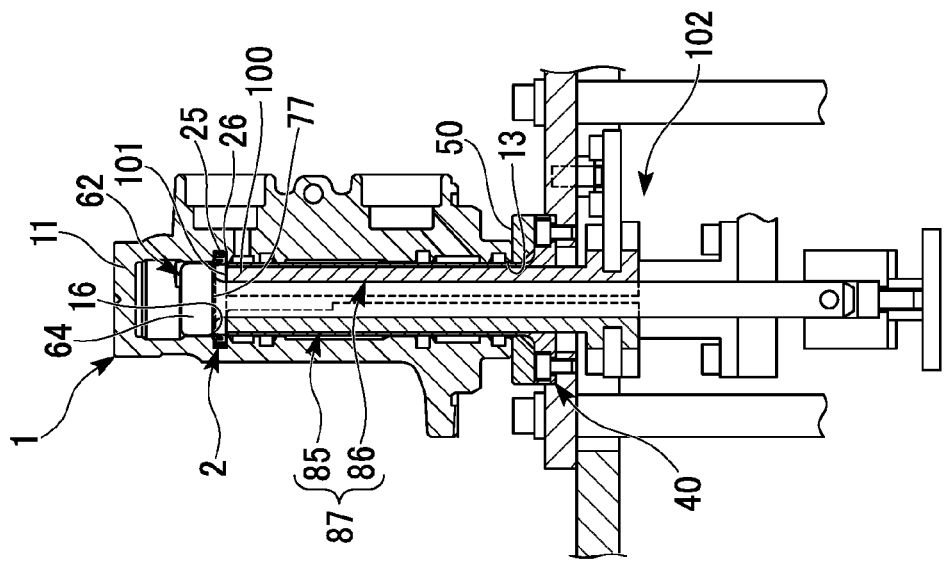
FIG. 11A is a side cross-sectional view showing the seal assembling apparatus of the first embodiment after a cylinder main body disposition process.

Next, the operator performs a cylinder main body disposition process. In the cylinder main body disposition process, as shown in FIG. 10C, the cylinder main body 1 is overlaid on the head section 64 of the center cored bar tool 62 and the cylindrical section 41 of the guide member 40 from the opening section 13 side in a posture in which the bottom section 11 is disposed upward, and finally, as shown in FIG. 11A, the end surface 15 abuts the pedestal 50. Accordingly, the cup seal 2 is disposed in the cylinder main body 1 while maintaining the inclined state, and thus is inclined with respect to the axial direction of the cylinder main body 1 such that one side in the radial direction becomes the bottom section 11 side of the cylinder main body 1. In other words, the cylinder main body disposition process is a process of inclining the cup seal 2 with respect to the axial direction of the cylinder main body 1 and inserting the cup seal 2 into the cylinder main body 1.

In the cylinder main body disposition process, the large diameter shaft section 69 of the head section 64 of the center cored bar tool 62 disposed at the lower limit position is fitted to an upper portion near the seal groove 16, which is an assembly target, in the slide guide section 14 of the cylinder main body. Accordingly, the end surface 77 of the center cored bar tool 62 matches the groove wall surface 25 over the seal groove 16 to a position in the axial direction. In addition, the front end surface 45 of the front end portion 44 of the guide member 40 matches the groove wall surface 26 under the seal groove 16 to a position in the axial direction. In this state, an upper side from the upper end of the seal groove 16 of the cylinder main body 1 is closed by the head section 64 of the center cored bar tool 62. Accordingly, here, an insertion limit in an upward direction of the cup seal 2 disposed between the small diameter shaft section 67 of the center cored bar tool 62 and the guide member 40 is defined by the head section 64 of the center cored bar tool 62. That is, the cylinder main body disposition process is a process of inserting the center cored bar tool 62 defining the insertion limit of the cup seal 2 into the cylinder main body 1 before moving the cup seal 2 to the seal groove 16 of the cylinder main body 1.

Further, in the cylinder main body disposition process, the cylinder main body 1 is also overlaid on a pair of the semi-tubular bodies 85 and 86 of the insertion jig 87 disposed in the guide member 40. Accordingly, the cylinder main body disposition process is a process of disposing the insertion jig 87 which moves the cup seal 2 in a direction toward the seal groove 16 in the cylinder main body 1. In other words, the cylinder main body disposition process is a process of disposing the insertion jig 87 constituted by the pair of semi-tubular bodies 85 and 86 in the cylinder main body 1 in a state in which the front end portions 93 and 100 are on different levels. The insertion jig 87 is constituted by the pair of semi-tubular bodies 85 and 86 that can be inserted between the center cored bar tool 62 and the cylinder main body 1.

Next, the operator performs a fourth button manipulation. When the fourth button manipulation is performed, the control unit 115 shown in FIG. 1 performs the set detection process. In the set detection process, the detection unit 113 is moved forward by the air cylinder 105 of the set detection mechanism 114, and after detection of presence of the cylinder main body 1 by the detection unit 113, the detection unit 113 is retracted to the release position shown in FIG. 1.

The control unit 115 generates an alarm sound from the alarm unit and displays an alarm display on the display unit when the detection unit 113 cannot detect presence of the cylinder main body 1. In this case, the operator covers the center cored bar tool 62 and the guide member 40 with the cylinder main body 1 to perform the fourth button manipulation again. When the fourth button manipulation is performed again, the control unit 115 stops the alarm sound from the alarm unit when the presence of the cylinder main body 1 is detected by the detection unit 113.

In the set detection process by the fourth button manipulation, when the detection unit 113 detects the presence of the cylinder main body 1, the control unit 115 is in a state in which a fifth button manipulation is received.

Figure 11B:
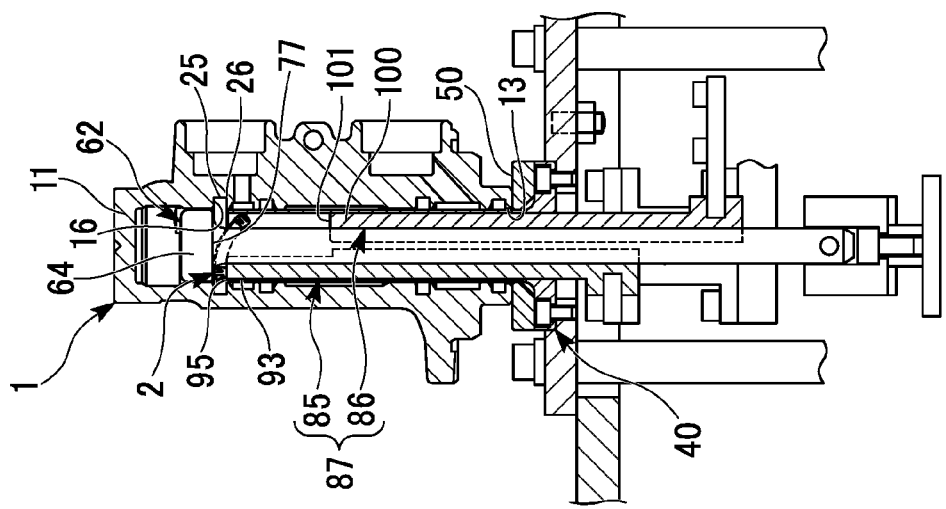
FIG. 11B is a side cross-sectional view showing the seal assembling apparatus of the first embodiment after an one side in a radial direction moving process.

The operator checks that the detection unit 113 is retracted to the release position and the alarm is not generated, and performs the fifth button manipulation. When the fifth button manipulation is performed, the control unit 115 performs an one side in the radial direction moving process of first raising the semi-tubular body 85 disposed higher than the semi-tubular body 86 to the upper limit position and stopping the semi-tubular body 85 by the air cylinder 52 of the assembly mechanism 102 as shown in FIG. 11B. Then, the semi-tubular body 85 abuts the one side in the radial direction near the bottom section 11 side of the cup seal 2 inclined with respect to the axial direction of the cylinder main body 1 with the front end surface 95 of the front end portion 93. In this state, the semi-tubular body 85 moves the cup seal 2 in a direction toward the seal groove 16 in the axial direction and raises the front end surface 95 to a position of the groove wall surface 26 of the opening section 13 side of the seal groove 16. Then, one side in the radial direction of the cup seal 2 is sandwiched between the end surface 77 of the head section 64 matched to a position of the groove wall surface 25 of the bottom section 11 side of the seal groove 16, which is an insertion limit of the cup seal 2, and the front end surface 95 matched to the groove wall surface 26 of the opening section 13 side of the seal groove 16, and runs substantially along the direction perpendicular to the axis of the cylinder main body 1. Here, since one side in the radial direction of the cup seal 2 protrudes from the guide member 40 and restriction by the guide member 40 is released, the cup seal 2 extends in a direction toward the seal groove 16 in the radial direction. In addition, here, the other side in the radial direction of the cup seal 2 is also pulled to one side in the radial direction to move in the direction of the end surface 77. The one side in the radial direction moving process is a process that the insertion jig 87 moves one side in the radial direction of the cup seal 2 to the insertion limit of the cup seal 2. The one side in the radial direction moving process is also a process that the front end portion 93 of the semi-tubular body 85, one of the pair of semi-tubular bodies 85 and 86, moves the cup seal 2 to the insertion limit of the cup seal 2.

Figure 11C:
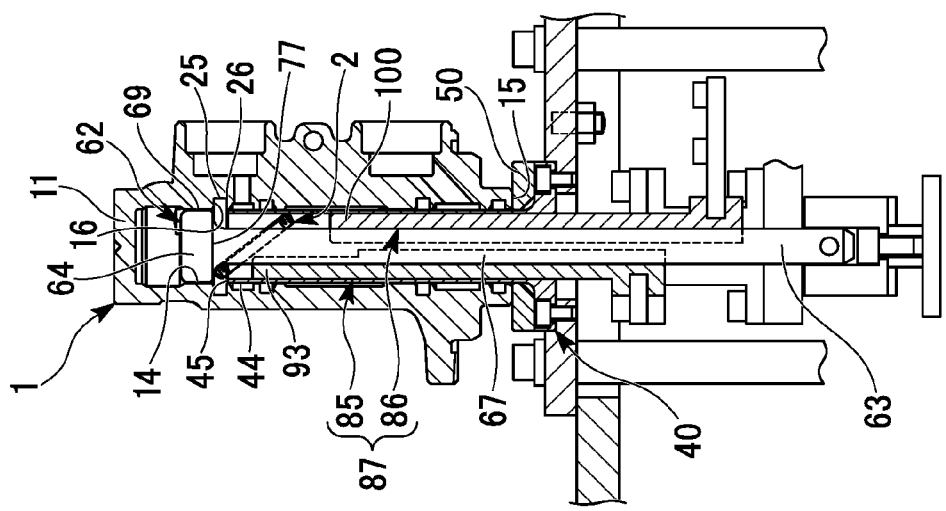
FIG. 11C is a side cross-sectional view showing the seal assembling apparatus of the first embodiment after an other side in the radial direction moving process.

When the semi-tubular body 85 is raised to the upper limit position as described above, next, the control unit 115 shown in FIG. 1 performs an other side in the radial direction moving process of raising the other semi-tubular body 86 to the upper limit position and stopping the semi-tubular body 86 by the air cylinder 53 as shown in FIG. 11C. The semi-tubular body 86 abuts the other side in the radial direction of the cup seal 2 inclined with respect to the axial direction of the cylinder main body 1 at the front end surface 101 of the front end portion 100 during the raising. The semi-tubular body 86 is raised to a position of the groove wall surface 26 of the opening section 13 side of the seal groove 16 while moving the front end surface 101 in a direction toward the seal groove 16 in the axial direction. The other side in the radial direction of the cup seal 2 is sandwiched between the end surface 77 of the head section 64 matched to a position of the groove wall surface 25 of the bottom section 11 side of the seal groove 16, which is the insertion limit of the cup seal 2, and the front end surface 101 matched to a position of the groove wall surface 26 of the opening section 13 side of the seal groove 16, running along the direction perpendicular to the axis of the cylinder main body 1. As a result, the entire cup seal 2 exits the guide member 40 while becoming a state along the direction perpendicular to the axis of the cylinder main body 1. Then, the cup seal 2 extends in the radial direction by an elastic force thereof to enter and be adhered to the seal groove 16. In other words, a state in which there are no extensions except for the seal groove 16 formed in the cylinder main body 1 by the cylinder main body 1, the center cored bar tool 62 and the insertion jig 87, and the cup seal 2 is guided into the seal groove 16. The other side in the radial direction moving process is a process that the insertion jig 87 moves the other side of the cup seal 2 in the radial direction to the insertion limit of the cup seal 2 after the one side in the radial direction moving process. In addition, the other side in the radial direction moving process is a process that the front end portion 100 of the other semi-tubular body 86 moves the cup seal 2 to the insertion limit of the cup seal 2 after the one side in the radial direction moving process.

As described above, the insertion jig 87 constituted by the pair of semi-tubular bodies 85 and 86 moves the cup seal 2 in the direction toward the seal groove 16 in a state inclined with respect to the axial direction of the cylinder main body 1. In other words, the insertion jig 87 movably installed at the outer circumferential side of the center cored bar tool 62 in the axial direction of the center cored bar tool 62 moves the cup seal 2 in the direction toward the seal groove 16 in a state inclined with respect to the axial direction of the center cored bar tool 62 such that one side in the radial direction of the cup seal 2 becomes the bottom section 11 side of the cylinder main body 1. Here, the insertion jig 87 moves the other side in the radial direction of the cup seal 2 to the insertion limit after one side in the radial direction of the cup seal 2 is moved to the insertion limit of the cup seal 2.

In this way, the cup seal 2 is assembled to the seal groove 16 of the cylinder main body 1 by the center cored bar tool 62 configured to define the insertion limit of the cup seal 2 and the insertion jig 87 movably installed at the outer circumferential side of the center cored bar tool 62 in the axial direction of the center cored bar tool 62.

Next, the operator performs the removal process of raising the cylinder main body 1 from the assembly mechanism 102. As shown in FIG. 12A, the cup seal 2 held in the seal groove 16 is raised with the cylinder main body 1 while the head section 64 of the center cored bar tool 62 passes through the inside of the cup seal 2. Then, as shown in FIG. 12B, the cylinder main body 1 comes out from the assembly mechanism 102 which includes the center cored bar tool 62, the guide member 40 and the insertion jig 87. In other words, the center cored bar tool 62, the guide member 40 and the insertion jig 87 are extracted from the cylinder main body 1. In this way, it is possible to obtain the cylinder main body 1 in a state in which the cup seal 2 is assembled to the seal groove 16. In addition, when assembly of the cup seal 2 to the seal groove 16 during the removal process is not properly performed, the cup seal 2 protrudes from the seal groove 16. For this reason, the cup seal 2 is hooked by the head section 64 of the center cored bar tool 62 to prevent deviation of the cylinder main body 1 from the center cored bar tool 62. The operator determines that the cup seal 2 is not properly assembled to the seal groove 16 when such a state occurs. That is, the removal process is a process of checking that the cup seal 2 is assembled to the seal groove 16 as the center cored bar tool 62 is separated from the cylinder main body 1 after assembly of the cup seal 2.

The control unit 115 receives a sixth button manipulation after the other side in the radial direction moving process is performed. The operator performs the sixth button manipulation after the cylinder main body 1 is detached from the assembly mechanism 102. When the sixth button manipulation is performed, the control unit 115 performs a return process of returning the seal assembling apparatus 3 to the initial state. In addition, the control unit 115 may automatically perform the return process, without awaiting the button manipulation, after the other side in the radial direction moving process is performed.

Even in the other seal grooves 17 to 19, the cup seal can be assembled to each of the grooves by the same seal assembling apparatus in which the pedestal 50 corresponding to each of the grooves is prepared.

Here, in the technique discussed in Published Japanese Translation No. 2004-521799 of the PCT International Application, the seal is inserted into the main body in a state in which the seal is deformed into a horseshoe shape by pliers, and then, disposed in the groove of the main body by releasing the deformation by the pliers. For this reason, the assembly task becomes complex, and thus working efficiency is not high. In addition, when the seal has a small diameter and high stiffness, it is likely to be difficult to deform the seal into the horseshoe shape using the pliers, and thus, the seal may not be assembled.

On the other hand, according to the first embodiment, when the cup seal 2 is inclined with respect to the axial direction of the cylinder main body 1 to be inserted into the cylinder main body 1 and pushed in the inclined state, the cup seal 2 is guided by the center cored bar tool 62 configured to define the insertion limit of the cup seal 2 and then the cup seal 2 is assembled to the seal groove 16. Accordingly, since there is no need to perform a complex task such as deformation of the cup seal 2 into the horseshoe shape, manufacturing efficiency can be improved. Furthermore, since there is no need to deform the cup seal 2 into the horseshoe shape, the cup seal 2 having a small diameter and high stiffness can be easily assembled to the cylinder main body having a small hole diameter.

In addition, since the center cored bar tool 62 configured to define the insertion limit of the cup seal 2 is inserted into the cylinder main body 1 and then the cup seal 2 is moved to the seal groove 16 of the cylinder main body 1, the cup seal 2 can be smoothly assembled to the seal groove 16.

Further, the insertion jig 87 configured to move the cup seal 2 in the direction toward the seal groove 16 in a state in which the cup seal 2 is inclined with respect to the axial direction of the cylinder main body 1 such that one side in the radial direction of the cup seal 2 becomes the bottom section 11 side of the cylinder main body 1 is disposed in the cylinder main body 1. For this reason, the cup seal 2 can be smoothly moved in the direction toward the seal groove 16 by the insertion jig 87 in a state in which the cup seal 2 is inclined with respect to the axial direction of the cylinder main body 1.

Furthermore, after the insertion jig 87 moves one side in the radial direction of the cup seal 2 to the insertion limit of the cup seal 2, the other side in the radial direction of the cup seal 2 is moved to the insertion limit of the cup seal 2. For this reason, the cup seal 2 can be smoothly disposed in the seal groove 16.

In addition, the insertion jig 87 is constituted by the pair of semi-tubular bodies 85 and 86 that can be inserted between the center cored bar tool 62 and the cylinder main body 1. For this reason, after one side in the radial direction of the inclined cup seal 2, which becomes the bottom section 11 side of the cylinder main body 1, is moved in the direction toward the seal groove 16 by the one semi-tubular body 85, the other side in the radial direction of the cup seal 2 can be moved in the direction toward the seal groove 16 by the other semi-tubular body 86. Accordingly, the cup seal 2 can be smoothly disposed in the seal groove 16.

Further, as the center cored bar tool 62 is extracted from the cylinder main body 1 after assembly of the cup seal 2, in order to check that the cup seal 2 is assembled to the seal groove 16, it is possible to check that the cup seal 2 is assembled to the seal groove 16 by a necessary task required for an assembly procedure.

According to the first embodiment, the center cored bar tool 62 configured to define the insertion limit of the cup seal 2 is inserted into the cylinder main body 1, and the cup seal 2 is simultaneously inclined with respect to the axial direction of the cylinder main body 1 to be disposed at the center cored bar tool 62. Further, the insertion jig 87 constituted by the pair of semi-tubular bodies 85 and 86 is disposed in the cylinder main body 1 in a state in which the front end portions 93 and 100 are on different levels. In this state, among the pair of semi-tubular bodies 85 and 86, after the front end portion 93 of the one semi-tubular body 85 moves the cup seal 2 to the insertion limit of the cup seal 2, the cup seal 2 is moved to the insertion limit of the cup seal 2 by the front end portion 100 of the other semi-tubular body 86. Accordingly, the cup seal 2 can be smoothly disposed in the seal groove 16. Therefore, since there is no need to perform a cumbersome task such as deformation of the cup seal 2 into the horseshoe shape, manufacturing efficiency can be improved. Further, since there is no need to deform the cup seal 2 into the horseshoe shape, the cup seal 2 having a small diameter and high stiffness can be easily assembled.

According to the first embodiment, after the insertion jig 87 moves one side in the radial direction of the cup seal 2 to the insertion limit in a state inclined with respect to the axial direction of the center cored bar tool 62, such that one side in the radial direction becomes the bottom section 11 side of the cylinder main body 1, when the other side in the radial direction is moved to the insertion limit, the cup seal 2 is smoothly disposed in the seal groove 16 through guide of the center cored bar tool 62 configured to define the insertion limit of the cup seal 2. Accordingly, since there is no need to perform a cumbersome task such as deformation of the cup seal 2 into the horseshoe shape, manufacturing efficiency can be improved. Further, since there is no need to deform the cup seal 2 into the horseshoe shape, the cup seal 2 having a small diameter and high stiffness can be easily assembled.

[Second Embodiment]

Next, the second embodiment will be described with reference to FIGS. 1 and 13A to 15B focusing on differences from the first embodiment. In addition, the same elements as in the first embodiment are represented by like names and reference numerals.

Figure 13A:
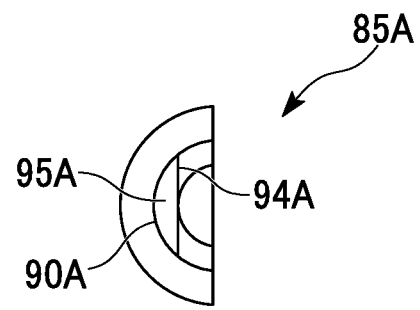
FIG. 13A is a plan view showing one member of an insertion jig of a seal assembling apparatus of a second embodiment.
Figure 13B:
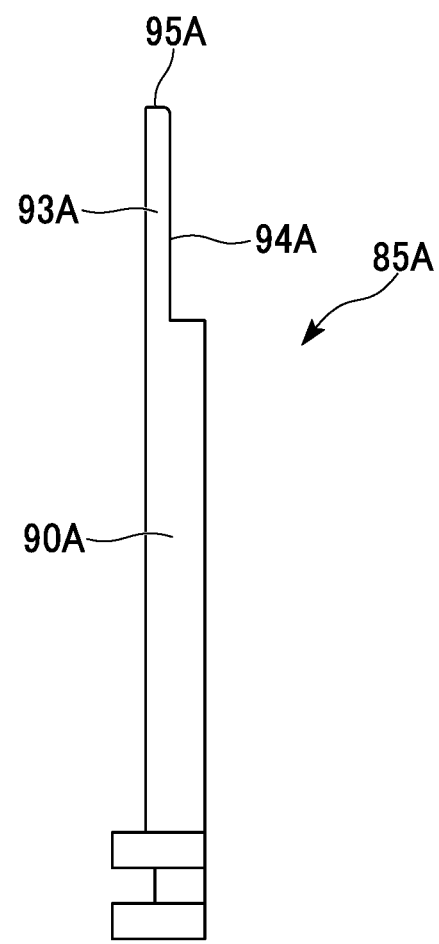
FIG. 13B is a side view showing one member of the insertion jig of the seal assembling apparatus of the second embodiment.

In the second embodiment, a semi-tubular body 85A having a semi-tubular section 90A shown in FIGS. 13A and 13B, slightly different from the first embodiment, is used. That is, in the second embodiment, as shown in FIG. 14A, the insertion jig 87A is constituted by the same semi-tubular body 86 as in the first embodiment, and the semi-tubular body 85A slightly different from the first embodiment. Specifically, as shown in FIGS. 13A and 13B, the semi-tubular section 90A of the semi-tubular body 85A has a stepped section 94A formed at a front end portion 93A and having a thickness in the radial direction from a center in the circumferential direction of the front end portion 93A smaller than the stepped section 94 of the first embodiment shown in FIG. 1. Accordingly, the semi-tubular body 85A has an area of the front end surface 95A in the direction perpendicular to the axis of the front end portion 93A smaller than that of the first embodiment.

In addition, in the second embodiment, the pedestal 50 of the first embodiment shown in FIG. 1 is not installed. In the second embodiment, a guide member 40A shown in FIG. 14A slightly different from the guide member 40 of the first embodiment is used. The guide member 40A has a flange section 42A having a thickness including a thickness of the pedestal 50 of the first embodiment. Further, a chamfer 120 having a diameter becoming larger as approaching to an end side of an end portion of a flange section 42A side in an axial direction of an inner circumferential section is formed at the guide member 40A. Accordingly, an inner circumference of the guide member 40A is constituted by an inner circumferential surface 46A having a constant diameter and the chamfer 120. A clamp mechanism 121 configured to clamp the guide member 40A is installed at the main table 29.

Further, in the second embodiment, as shown in FIG. 14A, the semi-tubular bodies 85A and 86 of the insertion jig 87A is configured to be lowered to a position at which the semi-tubular bodies 85A and 86 are extracted from the guide member 40A.

In the second embodiment, in an initial state, the insertion jig 87A is lowered to a position at which the insertion jig 87A is extracted from the guide member 40A. In addition, the guide member 40A is separated from the main table 29. In this state, a raising process, a temporary holding process, and a seal checking process, similar to the first embodiment, are performed.

The second embodiment is distinguished from the first embodiment after the seal checking process. Specifically, immediately after the seal checking process, a center cored bar tool lowering process is performed. That is, in the seal checking process, the control unit 115 performs the center cored bar tool lowering process of automatically lowering and stopping the center cored bar tool 62 to the lower limit position when the detection unit 108 shown in FIG. 1 detects that the cup seal 2 is mounted in a correct direction.

Then, the operator checks that the detection unit 108 is retracted to the release position, no alarm is generated and the center cored bar tool 62 is lowered to and stopped at the lower limit position, and lowers the cup seal 2 from the large diameter shaft section 69 of the center cored bar tool 62 to a height near the through-hole 34 while displacing the cup seal 2 from the large diameter shaft section 69 to the small diameter shaft section 67. At this position, an inclined disposition process of disposing the cup seal 2 in an inclined state such that the semi-tubular body 85A side in the horizontal direction, which is one side in the radial direction, is disposed upward, and the semi-tubular body 86 side in the horizontal direction, which is the other side in the radial direction, is disposed downward is performed.

Next, in a state in which the guide member 40A is previously inserted into the cylinder main body 1, as shown in FIG. 14A, the operator performs a cylinder main body/guide member disposition process of covering the center cored bar tool 62 with the guide member 40A and the cylinder main body 1, and fitting the guide member 40A into the large diameter hole 36 of the through-hole 34 to fix the guide member 40A to the main table 29 using the clamp mechanism 121. Here, the cup seal 2 disposed in an inclined state near the through-hole 34 of the center cored bar tool 62 is inclined with respect to the axial direction of the cylinder main body 1 such that one side in the radial direction disposed at an upper side enters the inner circumferential surface 46A through guidance of the chamfer 120 of the guide member 40A and one side in the radial direction becomes the bottom section 11 side of the cylinder main body 1. Accordingly, the cylinder main body/guide member disposition process is a process of inclining the cup seal 2 with respect to the axial direction of the cylinder main body 1 and inserting the cup seal 2 into the cylinder main body 1. In addition, the cylinder main body/guide member disposition process is a process of inserting the center cored bar tool 62 configured to define the insertion limit of the cup seal 2 into the cylinder main body 1 before moving the cup seal 2 to the seal groove 16 of the cylinder main body 1. Further, in the cylinder main body/guide member disposition process, the cylinder main body 1 may be overlaid on the guide member 40A after the guide member 40A is fixed to the main table 29.

After the cylinder main body/guide member disposition process, a positional relation between the cylinder main body 1, the guide member 40A and the center cored bar tool 62 becomes the same state as after the cylinder main body disposition process of the first embodiment. That is, the end surface 77 of the large diameter shaft section 69 of the head section 64 of the center cored bar tool 62 matches the groove wall surface 25 over the seal groove 16 with a position in the axial direction, and the front end surface 45 of the front end portion 44 of the guide member 40A matches the groove wall surface 26 under the seal groove 16 with a position in the axial direction.

In this state, when the next button manipulation is performed by the operator, similar to the first embodiment, the control unit 115 performs the one side in the radial direction moving process of raising and stopping the semi-tubular body 85A to the upper limit position. Then, as shown in FIG. 14B, the front end surface 95A of the front end portion 93A of the semi-tubular body 85A abuts one side in the radial direction of the cup seal 2 near the bottom section 11 during movement and presses the one side to move the direction toward the seal groove 16 in the axial direction, and as shown in FIG. 14C, raises the front end surface 95A to a position of the groove wall surface 26 of the opening section 13 side of the seal groove 16. During the movement, the cup seal 2 is inclined to conform to the inner circumferential surface 46A of the guide member 40A to become an elliptical shape.

When the semi-tubular body 85 is raised to the upper limit position, next, similar to the first embodiment, the control unit 115 performs the other side in the radial direction moving process of raising and stopping the semi-tubular body 86 to the upper limit position as shown in FIG. 15A. Then, the semi-tubular body 86 abuts the front end surface 101 of the front end portion 100 at the other side in the radial direction of the cup seal 2 during raising, moves the front end surface 101 in the direction toward the seal groove 16 in the axial direction, and raises the front end surface 101 to a position of the groove wall surface 26 of the opening section 13 side of the seal groove 16. As a result, similar to the first embodiment, as the cup seal 2 is disposed in the direction perpendicular to the axis of the cylinder main body 1 to exit the guide member 40A, the cup seal 2 extends in the radial direction by its own elastic force to enter and be adhered to the seal groove 16.

Next, the operator performs the same removal process as in the first embodiment. Then, as shown in FIG. 15B, the cup seal 2 held in the seal groove 16 is raised with the cylinder main body 1 with the head section 64 of the center cored bar tool 62 passing through the inside of the cup seal 2. Even in this case, when the cylinder main body 1 is not smoothly departed from the center cored bar tool 62, it is determined that the cup seal 2 cannot be smoothly assembled to the seal groove 16. After that, it is returned to the standby state in the return process.

[Third Embodiment]

Next, the third embodiment will be described with reference to FIGS. 1 and 16A to 16C focusing on differences from the first embodiment. In addition, the same elements as in the first embodiment are represented by like names and reference numerals.

In the third embodiment, an insertion jig 87B shown in FIGS. 16A to 16C, slightly different from the insertion jig 87 of the first embodiment shown in FIG. 1, is used. The insertion jig 87B is a tubular member having an integrated structure. The insertion jig 87B has a constant inner diameter slightly larger than the diameter of the small diameter shaft section 67 of the center cored bar tool 62 shown in FIG. 1. The insertion jig 87B has a cylindrical section 130, a flange section 131 and a flange section 132, as shown in FIGS. 16B and 16C.

The cylindrical section 130 has a cylindrical shape having an outer diameter slightly smaller than the inner diameter of the guide member 40 shown in FIG. 1. The cylindrical section 130 shown in FIGS. 16A to 16C is configured to be inserted between the small diameter shaft section 67 of the center cored bar tool 62 and the cylinder main body 1, which are shown in FIG. 1. In the cylindrical section 130 shown in FIGS. 16A to 16C, a front end portion 133 of one end surface in the axial direction has a front end surface 134, a step surface 135 and a pair of inclined surfaces 136. The front end surface 134 is disposed in the direction perpendicular to the axis at one side in the radial direction of the cylindrical section 130. The step surface 135 is disposed in the direction perpendicular to the axis at the other side in the radial direction of the cylindrical section 130 and inside in the axial direction farther than the front end surface 134. The pair of inclined surfaces 136 are inclined with respect to the axial direction by connecting near sides of the front end surface 134 and the step surface 135. Accordingly, a stepped section 137 is formed at the front end portion 133 of the cylindrical section 130 by the front end surface 134, the pair of inclined surfaces 136 and the step surface 135.

The flange section 131 is formed in an annular shape over the entire circumference to protrude from an end portion in the axial direction of the cylindrical section 130 opposite to the front end portion 133 outward in the radial direction. The flange section 132 is formed in an annular shape over the entire circumference to protrude from the front end portion 133 side in the axial direction rather than the flange section 131 of the cylindrical section 130 outward in the radial direction.

The insertion jig 87B inserts the cylindrical section 130 between the guide member 40 and the small diameter shaft section 67 of the center cored bar tool 62, which are shown in FIG. 1, in a posture in which the front end portion 133 is disposed at an upper side. Then, as the front end surface 134 is disposed at the operator side (a left side of FIG. 1) of the seal assembling apparatus 3 and the step surface 135 is disposed at an opposite side (a right side of FIG. 1) of the operator of the seal assembling apparatus 3, the insertion jig 87B is fixed to a rotational drive mechanism (not shown) at the flange sections 131 and 132. Then, the rotational drive mechanism (not shown) is supported by the elevation body 58 of the air cylinder 52 shown in FIG. 1. In addition, in this case, it is not necessary to install the air cylinder 53. The rotational drive mechanism (not shown) is configured to rotate the insertion jig 87B about its center axis. The insertion jig 87B is configured to match positions in the axial direction of the front end surface 134 and the groove wall surface 26 under the seal groove 16 of the cylinder main body 1 positioned by the pedestal 50 shown in FIG. 1 when the insertion jig 87B is raised to the upper limit position.

In the third embodiment, when in the initial state, the front end portion 133 side of the insertion jig 87B at the lower limit position is disposed in the guide member 40. Then, similar to the first embodiment, the raising process, the temporary holding process, the seal checking process, the inclined disposition process, the center cored bar tool lowering process, the cylinder main body disposition process and the set detection process are performed.

Here, in the inclined disposition process, as a result of the operator inclining the cup seal 2 at a position of the small diameter shaft section 67 such that a back side is disposed lower than a front side, the cup seal 2 is inclined to be matched to an uneven state between the front end surface 134 and the step surface 135 of the insertion jig 87B. In other words, in the inclined disposition process, the cup seal 2 is inclined such that the front end surface 134 side in the horizontal direction, which is one side in the radial direction, is disposed in the upper side, and the step surface 135 side in the horizontal direction, which is the other side in the radial direction, is disposed in the lower side. Further, in other words, in the inclined disposition process, the cup seal 2 is inclined to conform to the stepped shape of the front end portion 133 of the insertion jig 87. In addition, in the cylinder main body disposition process, the cylinder main body 1 is also overlaid on the cylindrical section 130 of the insertion jig 87B. Thereby, the insertion jig 87B is disposed in the cylinder main body 1.

Then, when the fifth button manipulation is performed, the control unit 115 performs an axial direction moving process of raising and stopping the insertion jig 87B to the upper limit position as it is. Then, similar to the one side in the radial direction moving process of the first embodiment, the front end surface 134 of the insertion jig 87B abuts one side in the radial direction near the bottom section 11 side of the cup seal 2 in the inclined state and moves the one side in the direction toward the seal groove 16 in the axial direction, and raises the front end surface 134 to a position of the groove wall surface 26 of the opening section 13 side of the seal groove 16. Then, one side in the radial direction of the cup seal 2 is sandwiched between the end surface 77 of the head section 64 of the center cored bar tool 62 and the front end surface 134 of the insertion jig 87B to be substantially parallel to the direction perpendicular to the axis of the cylinder main body 1. Even at this time, one side in the radial direction of the cup seal 2 protrudes from the guide member 40 and extends in the direction toward the seal groove 16 in the radial direction. In addition, even at this time, the other side in the radial direction of the cup seal 2 is also pulled to one side in the radial direction to move in the direction toward the end surface 77. Accordingly, the axial direction moving process is a process that the insertion jig 87B moves the one side in the radial direction of the cup seal 2 to the insertion limit of the cup seal 2. In addition, since the stepped section 137 is formed at the insertion jig 87B, the cup seal 2 in the inclined state, except for the one side in the radial direction, can be escaped by a shape of the stepped section 137, and only the one side in the radial direction of the cup seal 2 can be properly pressed. In other words, since the inclined surfaces 136 is formed at the insertion jig 87B, the cup seal 2 in the inclined state, except for the one side in the radial direction, can be escaped by a shape of the inclined surfaces 136, and only the one side in the radial direction of the cup seal 2 can be properly pressed.

When the insertion jig 87B is raised to the upper limit position, next, the control unit 115 performs the rotation process of rotating the insertion jig 87B by the rotational drive mechanism (not shown). Then, the insertion jig 87B contacts the other side in the radial direction of the cup seal 2 in a still slightly inclined state with respect to the axial direction of the cylinder main body 1 by the front end surface 134, and moves the cup seal 2 in the direction toward the seal groove 16 in the axial direction. Then, as the entire cup seal 2 is disposed in the direction perpendicular to the axis of the cylinder main body 1 and exits the guide member 40, the cup seal 2 extends in the radial direction to enter and be adhered to the seal groove 16 by its own elastic force. In addition, while a rotational angle of the insertion jig 87B in the rotation process becomes 360 degrees to return to the standby state, the cup seal 2 can be assembled to the seal groove 16 when the angle is at least 180 degrees.

As described above, the insertion jig 87B also moves the cup seal 2 in the direction toward the seal groove 16 in a state in which the cup seal 2 is inclined with respect to the axial direction of the cylinder main body 1. In other words, the insertion jig 87B movably installed at the outer circumferential side of the center cored bar tool 62 in the axial direction of the center cored bar tool 62 moves the cup seal 2 in the direction toward the seal groove 16 in a state in which the cup seal 2 is inclined with respect to the axial direction of the center cored bar tool 62 such that the one side in the radial direction of the cup seal 2 becomes the bottom section 11 side of the cylinder main body 1. Here, after the one side in the radial direction of the cup seal 2 is moved to the insertion limit of the cup seal 2, the other side in the radial direction of the cup seal 2 is moved to the insertion limit. After the rotation process, when the same removal process as the first embodiment is performed, a return process of returning to the standby state is performed.

According to the third embodiment, since the insertion jig 87B is formed of a tubular member and has the stepped section 137 formed at a front end thereof, the cup seal 2 in the inclined state, except for the one side in the radial direction, is escaped by a shape of the stepped section 137, and only the one side in the radial direction of the cup seal 2 can be pressed to move the cup seal 2 in the inclined state.

In addition, since the insertion jig 87B is formed of a tubular member and has the stepped section 136 formed at a front end thereof, the cup seal 2 in the inclined state, except for the one side in the radial direction, is escaped by a shape of the stepped section 136, and only the one side in the radial direction of the cup seal 2 can be pressed to move the cup seal 2 in the inclined state.

Further, instead of the insertion jigs 87, 87A and 87B of the embodiments, a plurality of rod-shaped members that can be inserted between the center cored bar tool 62 and the cylinder main body 1 may be used. For example, instead of the semi-tubular body 85 of the first embodiment, the one side in the radial direction may be constituted by the plurality of rod-shaped members. In addition, instead of the semi-tubular body 86, the other side in the radial direction may be constituted by the plurality of rod-shaped members. The semi-tubular body 85 and the semi-tubular body 86 may be separately raised or lowered, or instead of the insertion jig 87B of the third embodiment, the plurality of rod-shaped members can be disposed in the stepped shape to be integrally raised and lowered.

According to the above-mentioned embodiment, in a seal assembling method of the master cylinder for assembling the cup seal for sealing the piston slidably moving in the cylinder main body to the seal groove formed in the bottomed-tubular cylinder main body in an annular shape, the cup seal is inclined with respect to the axial direction of the cylinder main body to be inserted into the cylinder main body, and assembled to the seal groove by the center cored bar tool for defining the insertion limit of the cup seal. In this way, when the cup seal is inclined with respect to the axial direction of the cylinder main body to be inserted and pushed into the cylinder main body in the inclined state, the cup seal can be guided by the center cored bar tool for defining the insertion limit of the cup seal to be assembled to the seal groove. Accordingly, manufacturing efficiency can be improved.

In addition, before the cup seal is moved to the seal groove of the cylinder main body, a process of inserting the center cored bar tool for defining the insertion limit of the cup seal into the cylinder main body is provided. Accordingly, after the center cored bar tool for defining the insertion limit of the cup seal is inserted into the cylinder main body, the cup seal is moved to the seal groove of the cylinder main body. For this reason, the cup seal can be smoothly assembled to the seal groove.

Further, a process of disposing the insertion jig in the cylinder main body is provided, wherein the insertion jig moves the cup seal in the direction toward the seal groove in a state in which the cup seal is inclined with respect to the axial direction of the cylinder main body such that the one side in the radial direction of the cup seal becomes the bottom section side of the cylinder main body. Accordingly, the cup seal can be smoothly moved in the direction toward the seal groove by the insertion jig in a state in which the cup seal is inclined with respect to the axial direction of the cylinder main body.

Furthermore, after the insertion jig moves the one side in the radial direction of the cup seal to the insertion limit of the cup seal, a process of moving the other side in the radial direction of the cup seal to the insertion limit is provided. Accordingly, the cup seal can be smoothly disposed in the seal groove.

In addition, the insertion jig includes a pair of semi-tubular bodies that can be inserted between the center cored bar tool and the cylinder main body. Accordingly, after the one side in the radial direction disposed at the bottom section side of the cylinder main body of the inclined cup seal is moved in the direction toward the seal groove by one semi-tubular body, the other side in the radial direction of the cup seal can be moved in the direction toward the seal groove by the other semi-tubular body. Accordingly, the cup seal can be smoothly disposed in the seal groove.

Further, the insertion jig is constituted by a tubular member that can be inserted between the center cored bar tool and the cylinder main body and having a stepped section formed at a front end. Accordingly, the cup seal in the inclined state, except for the one side in the radial direction, can be escaped by a shape of the stepped section, and only the one side in the radial direction of the cup seal can be pressed to move the cup seal in the inclined state.

Furthermore, the insertion jig is constituted by a tubular member that can be inserted between the center cored bar tool and the cylinder main body and having an inclined surface formed at a front end. Accordingly, the cup seal in the inclined state, except for the one side in the radial direction, can be escaped by a shape of the inclined surface, and only the one side in the radial direction of the cup seal can be pressed to move the cup seal in the inclined state.

In addition, after assembly of the cup seal, as the center cored bar tool is extracted from the cylinder main body, a process of determining that the cup seal is assembled to the seal groove is provided. Accordingly, it is possible to determine that the cup seal is assembled to the seal groove by a necessary task.

The seal assembling method of the master cylinder for assembling the cup seal for sealing the piston slidably moving in the cylinder main body to the seal groove formed in the bottomed-tubular cylinder main body in an annular shape includes inserting the center cored bar tool for defining the insertion limit of the cup seal into the cylinder main body, inclining the cup seal with respect to the axial direction of the cylinder main body and disposing the cup seal on the center cored bar tool, disposing the insertion jig constituted by the pair of semi-tubular bodies for moving the cup seal in the direction toward the seal groove in a state in which the cup seal is inclined with respect to the axial direction of the cylinder main body into the cylinder main body in a state in which the front end portions thereof are on different levels, and moving the cup seal to the insertion limit of the cup seal by the front end portion of one semi-tubular body of the pair of semi-tubular body, and then moving the cup seal to the insertion limit of the cup seal by the front end portion of the other semi-tubular body. Accordingly, the center cored bar tool for defining the insertion limit of the cup seal is inserted into the cylinder main body, and the cup seal is inclined with respect to the axial direction of the cylinder main body to be disposed on the center cored bar tool. Further, the insertion jig constituted by the pair of semi-tubular bodies is disposed on the cylinder main body in a state in which the front end portions thereof are on different levels. In this state, after the front end portion of one semi-tubular body of the pair of semi-tubular bodies moves the cup seal to the insertion limit of the cup seal, when the cup seal is moved to the insertion limit of the cup seal by the front end portion of the other semi-tubular body, the cup seal can be smoothly disposed in the seal groove. Accordingly, the manufacturing efficiency can be improved.

The seal assembling apparatus of the master cylinder for assembling the cup seal for sealing the piston slidably moving in the cylinder main body to the seal groove formed in the bottomed-tubular cylinder main body in an annular shape includes the center cored bar tool configured to define the insertion limit of the cup seal that is capable of being inserted into the cylinder main body, and the insertion jig movably installed at the outer circumferential side of the center cored bar tool in the axial direction of the center cored bar tool and configured to move the cup seal in the direction toward the seal groove in a state in which the cup seal is inclined with respect to the axial direction of the center cored bar tool such that the one side in the radial direction of the cup seal becomes the bottom section side of the cylinder main body. After the insertion jig moves the one side in the radial direction of the cup seal to the insertion limit of the cup seal, the other side in the radial direction of the cup seal is moved to the insertion limit. Accordingly, after the insertion jig moves the one side in the radial direction of the cup seal to the insertion limit in a state in which the cup seal is inclined with respect to the axial direction of the center cored bar tool such that the one side in the radial direction becomes the bottom section side of the cylinder main body, when the other side in the radial direction is moved to the insertion limit, the cup seal can be smoothly disposed in the seal groove through guidance of the center cored bar tool for defining the insertion limit of the cup seal. Accordingly, the manufacturing efficiency can be improved.

The seal assembling method of the master cylinder for assembling the cup seal for sealing the piston slidably moving in the cylinder main body to the seal groove formed in the bottomed-tubular cylinder main body in an annular shape includes inserting the center cored bar tool for defining the insertion limit of the cup seal into the cylinder main body, moving the cup seal in the direction toward the seal groove by the insertion jig in a state in which the cup seal is inclined with respect to the axial direction of the cylinder main body such that the one side in the radial direction of the cup seal becomes the bottom section side of the cylinder main body, and moving one side in the radial direction of the cup seal to the insertion limit of the cup seal using the insertion jig and then moving the other side in the radial direction of the cup seal to the insertion limit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A seal assembling method of a master cylinder for assembling a cup seal for sealing a piston slidably moving in a bottomed-tubular cylinder main body to a seal groove formed in the cylinder main body in an annular shape using an insertion jig, the seal assembling method of the master cylinder comprising:
   mounting the cup seal on the outer periphery of a shaft of a section of a center cored bar tool while inclining the cup seal with respect to an axial direction of the shaft section, wherein the center cored bar tool includes the shaft section and a head section, the outer diameter of the head section being larger than the outer diameter of he shaft section;
   inserting the center cored bar tool into the cylinder main body in a state where the cup seal is mounted on the center cored bar tool with the cup seal inclined with respect to the axial direction of the shaft section;
   moving one side of the cup seal in the radial direction to an insertion limit of the cup seal in a state where a position of the head section of the center cored bar tool for defining the insertion limit of the cup seal with respect to the cylinder main body is aligned with the seal groove, wherein the insertion jig is a pair of semi-tubular bodies constituted by a first semi-tubular body and a second semi-tubular body, the one side of the cup seal in the radial direction is inserted into the seal groove using the first semi-tubular body, and the one side of the cup seal in the radial direction is close to the seal groove;
   moving the other side of the cup seal in the radial direction to the insertion limit using the second semi-tubular body in a state where the one side of the cup seal in the radial direction is pressed by the first semi-tubular body and the head section of the center cored bar tool; and
   assembling the cup seal to the seal groove, wherein the head section of the center cored bar toll passes through the inside of the cup seal which is assembled in the seal groove.

2. The seal assembling method of the master cylinder according to claim 1, further comprising:
   before moving the cup seal to the seal groove of the cylinder main body, inserting the center cored bar tool for limiting the insertion limit of the cup seal into the cylinder main body.

3. The seal assembling method of the master cylinder according to claim 2, further comprising:
   disposing the insertion jig into the cylinder main body, wherein the insertion jig moves the cup seal in the direction toward the seal groove in a state in which the cup seal is inclined with respect to the axial direction of the cylinder main body such that one side of the cup seal in a radial direction becomes a bottom section side of the cylinder main body.

4. The seal assembling method of the master cylinder according to claim 1, further comprising, after assembly of the cup seal, a process of determining that the cup seal is assembled to a whole circumference of the seal groove as the center cored bar tool is extracted from the cylinder main body, wherein the center cored bar tool has a portion having a size making a gap formed between the cup seal and a slide guide section of the cylinder main body where the piston slides smaller than a thickness of the cup seal in the radial direction.

5. A seal assembling method of a master cylinder for assembling a cup seal for sealing a piston slidably moving in a bottomed-tubular cylinder main body to a seal groove formed in the cylinder main body in an annular shape, the seal assembling method of the master cylinder comprising:

mounting the cup seal on the outer periphery of a shaft section of a center cored bar tool while inclining the cup seal with respect to an axial direction of the shaft section, wherein the center cored bar tool includes the shaft section and a head section, the outer diameter of the head section being larger than the outer diameter of the shaft section inserting the center cored bar tool into the cylinder main body in a state where the cup seal is mounted on the center cored bar tool with the cup seal inclined with respect to the axial direction of the shaft section;

moving the cup seal in a direction toward the seal groove using an insertion jig constituted by a plurality of rod-shaped members in a state in which the cup seal is inclined with respect to an axial direction of the cylinder main body such that one side of the cup seal becomes a bottom section side of the cylinder main body, wherein the insertion jig includes a first rod-shaped member and a second rod-shaped member;

moving the other side of the cup seal in the radial direction to an insertion limit of the cup seal using the second rod-shaped member after moving and positioning the one side of the cup seal in the radial direction to the insertion limit using the first rod-shaped member; and assembling the cup seal to the seal groove, wherein the head section of the center cored bar tool passes through the inside of the cup seal which is assembled in the seal groove.

6. The seal assembling method of the master cylinder according to claim 5, further comprising:

after assembly of the cup seal, determining that the cup seal is assembled to a whole circumference of the seal groove as the center cored bar tool is separated from the cylinder main body wherein the center cored bar tool has a head section having a size making a gap formed between the cup seal and a slide guide section of the cylinder main body where the piston slides smaller than a thickness of the cup seal in the radial direction.

* * * * *